US011392908B2

(12) United States Patent
Cuan et al.

(10) Patent No.: US 11,392,908 B2
(45) Date of Patent: Jul. 19, 2022

(54) DONATING BENEFIT ACCOUNT REWARDS

(71) Applicant: Capital One Services, LLC, McLean, VA (US)

(72) Inventors: Lukiih Cuan, Arlington, VA (US); Shaun Webb, Oakland, CA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/832,827

(22) Filed: Mar. 27, 2020

(65) Prior Publication Data
US 2021/0304161 A1    Sep. 30, 2021

(51) Int. Cl.
*G06Q 20/10*      (2012.01)
*G06N 20/00*      (2019.01)
*G06Q 30/02*      (2012.01)

(52) U.S. Cl.
CPC ........... *G06Q 20/102* (2013.01); *G06N 20/00* (2019.01); *G06Q 30/0215* (2013.01); *G06Q 30/0279* (2013.01)

(58) Field of Classification Search
CPC . G06Q 30/0215; G06Q 30/0279; G06N 20/00
USPC ..................................................... 705/14.17
See application file for complete search history.

(56) References Cited

U.S. PATENT DOCUMENTS

| | | | |
|---|---|---|---|
| 2018/0182000 A1* | 6/2018 | Cook | G06Q 30/0279 |
| 2019/0043138 A1* | 2/2019 | Blake | G06Q 30/0279 |
| 2019/0168533 A1 | 6/2019 | Abe et al. | |
| 2020/0258105 A1* | 8/2020 | Hankinson | G06K 9/00677 |

OTHER PUBLICATIONS

Kerr, R., "How to Combine Your Wells Fargo Points to Get Maximum Value," ThePointsGuy, Aug. 24, 2018, 18 pages.
Saks Frankel, R., "Wells Fargo Go Far Rewards: How to Earn and Use Them," NerdWallet, Mar. 20, 2020, 17 pages.
Kaye, K., "Missing the Point: $100 Billion in Loyalty Points Are Unclaimed," AdAge, May 26, 2017, 4 pages.
Tsosie, et al., "2018 American Household Credit Card Debt Study," NerdWallet, Dec. 10, 2018, 12 pages.
"3 in 10 Have Never Redeemed Credit Card Rewards," PRNewswire, Apr. 12, 2017, 3 pages, New York.

* cited by examiner

*Primary Examiner* — Lindsay M Maguire
(74) *Attorney, Agent, or Firm* — Harrity & Harrity, LLP

(57) ABSTRACT

A device may process information associated with a first set of users with benefit accounts to determine a first subset of users that have a likelihood of donating and may identify a donor user with a benefit account having a credit balance from among the first subset of users. The device may process information associated with a second set of users with accounts having debit balances to determine a second subset of users that have a likelihood of not paying off the debit balances and may identify a recipient user with an account having a debit balance from among the second subset of users. The device may receive authorization to use a portion of the credit balance of the donor user to reduce the debit balance of the recipient user and may perform an action to facilitate use of the portion of the credit balance to reduce the debit balance.

20 Claims, 9 Drawing Sheets

DONATING BENEFIT ACCOUNT REWARDS

BACKGROUND

A benefit program is a marketing program designed to encourage customers to transact with an organization associated with the benefit program. Customers who participate in a benefit program may be associated with a benefit account, and may be offered an allotment of benefit rewards, associated with the benefit account, that the customers can apply to future transactions.

SUMMARY

According to some implementations, a method may include processing, by a first device, information associated with a first set of users with benefit accounts using a first machine learning model to determine a first subset of users with benefit accounts that have a likelihood of donating; identifying, by the first device, a donor user with a benefit account having a credit balance from among the first subset of users with benefit accounts having a likelihood of donating; processing, by the first device, information associated with a second set of users with accounts having debit balances using a second machine learning model to determine a second subset of users with accounts having debit balances that have a likelihood of not paying off the debit balances; identifying, by the first device, a recipient user with an account having a debit balance from among the second subset of users having a likelihood of not paying off the debit balances; receiving, by the first device and from a second device, authorization to use a portion of the credit balance from the benefit account of the donor user to reduce the debit balance of the account of the recipient user; performing, by the first device, an action to facilitate use of the portion of the credit balance from the benefit account of the donor user to reduce the debit balance of the account of the recipient user; performing, by the first device, an action to reduce the credit balance of the benefit account of the donor user; and providing, by the first device and to a third device, a notification that the debit balance of the account of the recipient user has been reduced using the portion of the credit balance from the benefit account of the donor user.

According to some implementations, a first device may include one or more memories; and one or more processors, communicatively coupled to the one or more memories, configured to: process information associated with a first set of users with benefit accounts using a first machine learning model to determine a first subset of users with benefit accounts that have a likelihood of donating; identify a donor user with a benefit account having a credit balance from among the first subset of users with benefit accounts having a likelihood of donating; process information associated with a second set of users with accounts having debit balances using a second machine learning model to determine a second subset of users with accounts having debit balances that have a likelihood of not paying off the debit balances; identify a recipient user with an account having a debit balance from among the second subset of users having a likelihood of not paying off the debit balances; receive, from a second device, authorization to use a portion of the credit balance from the benefit account of the donor user to reduce the debit balance of the account of the recipient user; perform, based on the authorization, an action to facilitate use of the portion of the credit balance from the benefit account of the donor user to reduce the debit balance of the account of the recipient user; and perform, based on the authorization, an action to reduce the credit balance of the benefit account of the donor user.

According to some implementations, a non-transitory computer-readable medium may store one or more instructions. The one or more instructions, when executed by one or more processors of a first device, may cause the one or more processors to: identify a donor user with a benefit account having a credit balance; process information associated with a first set of users with accounts having debit balances using a first machine learning model to determine a first subset of users with accounts having debit balances that have a likelihood of not paying off the debit balances; identify a recipient user with an account having a debit balance from among the first subset of users having a likelihood of not paying off the debit balance; receive authorization to use a portion of the credit balance from the benefit account of the donor user to reduce the debit balance of the account of the recipient user; perform an action to facilitate use of the portion of the credit balance from the benefit account of the donor user to reduce the debit balance of the account of the recipient user; and perform an action to reduce the credit balance of the benefit account of the donor user.

DETAILED DESCRIPTION

Figure 1A:
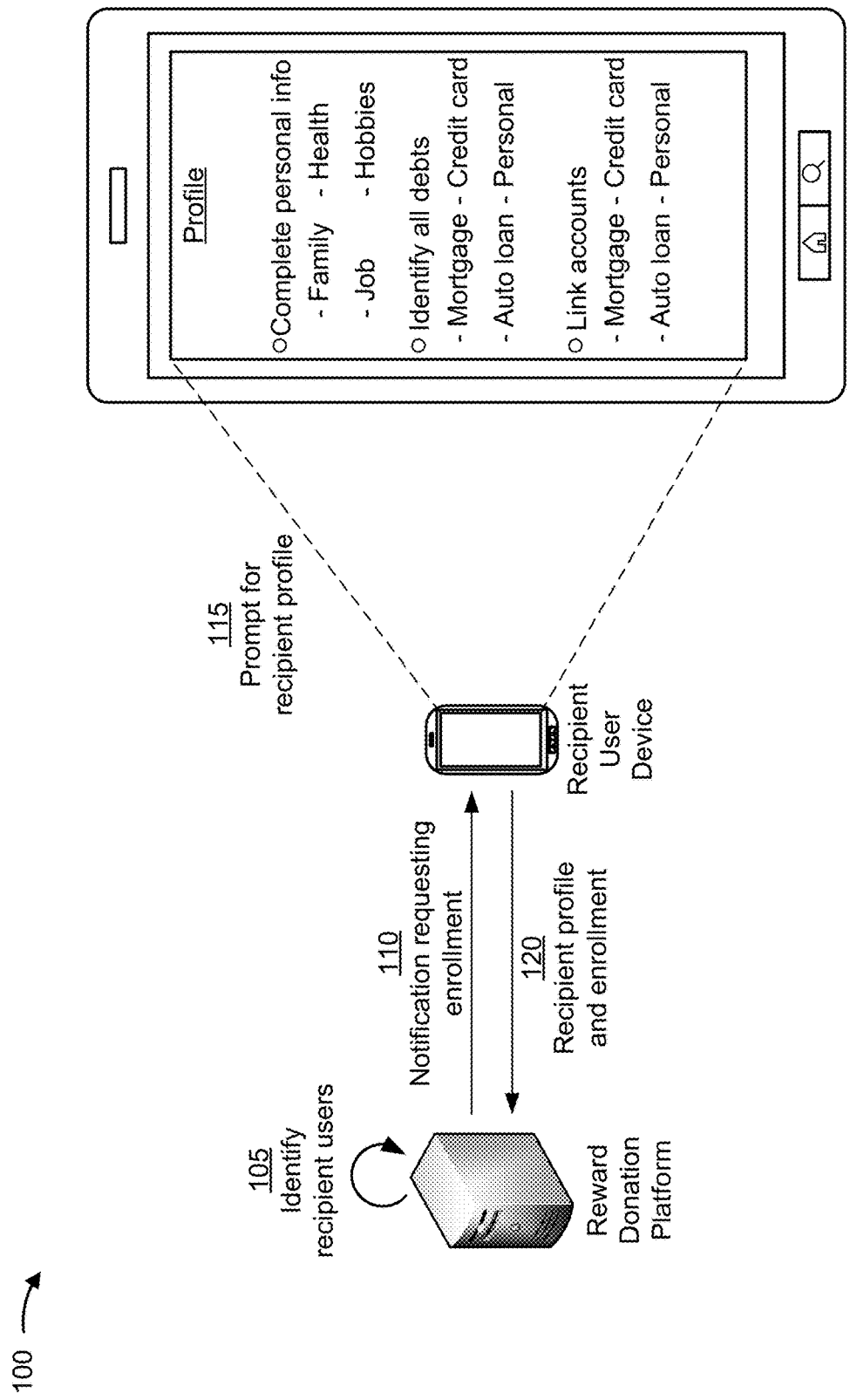
FIGS. 1A-1D are diagrams of one or more example implementations described herein.

The following detailed description of example implementations refers to the accompanying drawings. The same reference numbers in different drawings may identify the same or similar elements.

According to recent studies, U.S. households, from month to month, carry credit card balances totaling more than $430 billion. The average U.S. household with credit card debt carries forward more than $6,800 monthly in credit card debt. Additionally, U.S. households with any kind of debt hold an average of over $136,000 in outstanding debt, which includes credit card debt, mortgages, personal loans, education loans, unpaid medical bills, and/or the like. Financial institutions associated with debt regularly track and calculate interest rates and/or associated fees, run analyses to determine whether accounts will likely become delinquent, notify credit agencies of payment issues, determine risk factors of customers, perform collection attempts (e.g., physical and electronic debtor notices, automated and personal phone calls, and/or the like), lock accounts for failure to pay, and/or the like. The activities required of financial institutions for the numerous customers with debit balances, as compared to customers that do not hold debit balances or debts, consumes financial resources, computing resources (e.g., processing resources, memory resources, power resources, communication resources, and/or the like), and/or network resources.

Additionally, recent studies indicate that customers with benefit accounts fail to claim approximately $100 billion worth of benefit rewards. Unclaimed benefits can lead to negative customer views regarding the benefit program. Furthermore, the financial institution and/or company offering the benefit program must carry a liability for the unclaimed benefit rewards. Thus, the financial institution and/or company offering the benefit program typically markets the benefit program to existing customers to encourage use of the credit balances, which consumes financial resources, computing resources (e.g., processing resources, memory resources, power resources, communication resources, and/or the like), and/or network resources.

Some implementations described herein may provide a reward donation platform that identifies recipient users having accounts with debit balances (e.g., recipient users associated with a likelihood of not paying off debit balances and/or the like), identifies donor users having benefit accounts with credit balances (e.g., unclaimed benefit rewards and/or the like), and performs one or more actions to obtain authorization from the donor users to use portions of the credit balances to reduce the debit balances of the recipient users. In some implementations, the reward donation platform may identify recipient users and/or donor users using machine learning models. In some implementations, the reward donation platform may provide a notification to a recipient user that the debit balance has been reduced by a donation and/or a notification to a donor user that a portion of the credit balance has been used to reduce a debit balance. In this way, the reward donation platform may conserve financial resources, computing resources (e.g., processing resources, memory resources, power resources, communication resources, and/or the like), and/or network resources that would otherwise be used by financial institutions to service, analyze, and/or collect on accounts having debit balances. Additionally, or alternatively, the reward donation platform may conserve financial resources associated with the liability of unclaimed credit balances as well as computing resources (e.g., processing resources, memory resources, power resources, communication resources, and/or the like), and/or network resources that would otherwise be used to market benefit programs to benefit account holders to encourage use of credit balances.

FIGS. 1A-1D are diagrams of one or more example implementations 100 described herein. As shown in FIGS. 1A-1D, example implementation(s) 100 includes a reward donation platform, a recipient user device, and a donor user device. In practice, the reward donation platform may be associated with a plurality of recipient user devices (e.g., hundreds, thousands, millions, or more recipient user devices) and a plurality of donor user devices (e.g., hundreds, thousands, millions, or more donor user devices). As described herein, the reward donation platform may be associated with a financial institution (e.g., a bank or a credit card issuer). In some implementations, the reward donation platform may be associated with an organization, other than a financial institution, such as a charity organization, a non-profit organization, and/or the like.

In some implementations, the reward donation platform may administer a reward donation program that permits donor users to donate portions of credit balances from benefit accounts to reduce debit balances of accounts of recipient users. As shown in FIG. 1A, and by reference number 105, the reward donation platform may identify recipient users having accounts with debit balances (e.g., a credit card account, a mortgage, an education loan account, a vehicle loan account, a medical account (e.g., a hospital account, a doctor account, and/or the like), a personal loan account, and/or the like). In some implementations, the reward donation platform may identify recipient users that are likely to benefit from debt relief, such as recipient users that have a likelihood of not paying off the debit balances.

As described herein, the reward donation platform may use one or more artificial intelligence techniques, such as machine learning, deep learning, and/or the like to identify recipient users that have a likelihood of not paying off the debit balances.

In some implementations, the reward donation platform may parse natural language descriptions of historical information for a plurality of users including account information (e.g., types of accounts of the users, loan terms associated with accounts of the users, initial balances of accounts of the users, current balances of accounts of the users, and/or the like), transaction histories (e.g., payment histories of accounts of the users, interest rate increases and/or decreases for accounts of the users, fees charged to accounts of the users (e.g., for late payment, underpayment, and/or the like), withdrawals from accounts of the users, and/or the like), outcomes of accounts (e.g., an account was paid in full, an account was closed without being paid in full, an account was suspended, an account was sent to collections, and/or the like), and/or the like. For example, the reward donation platform may obtain data identifying, in natural language, descriptions of historical information for a plurality of users, and may parse the data to identify characteristics of the plurality of users (e.g., types of accounts held by the plurality of users, number of accounts held by the plurality of users, loan terms of accounts held by the plurality of users, initial balances of accounts held by the plurality of users, transaction histories of accounts held by the plurality of users, and/or the like), and/or the like. The reward donation platform may obtain the historical information from one or more sources, such as a financial institution, a collections agency, a government agency, a law enforcement agency, and/or the like.

In some implementations, the reward donation platform may determine a characteristic of a user based on natural language processing of the historical information, which may include a description of the user characteristic. For example, based on a description of a user characteristic being identified as being associated with a likelihood of not paying off a debit balance, the reward donation platform may use natural language processing to determine that an attribute of the user characteristic is that the user characteristic is associated with a likelihood of not paying off a debit balance. Similarly, based on a description of the user characteristic being described as not being associated with a likelihood of not paying off a debit balance, the reward donation platform may use natural language processing to determine that an attribute of the user characteristic is that the user characteristic is not associated with a likelihood of not paying off a debit balance, and/or the like. In this case, the reward donation platform may determine that a natural language text corresponds to an attribute of a user characteristic based on data relating to other user characteristics, data identifying attributes of user characteristics, and/or the like.

In this way, the reward donation platform may identify user characteristics associated with a likelihood of not paying off a debit balance, as described herein. Based on applying a rigorous and automated process associated with determining a likelihood of not paying off a debit balance associated with a user, the reward donation platform enables recognition and/or identification of thousands, millions, or billions of user characteristics, thereby increasing an accuracy and consistency of identifying recipient users that have a likelihood of not paying off the debit balances relative to requiring computing resources to be allocated for hundreds or thousands of technicians to manually identify recipient users that have a likelihood of not paying off the debit balances based on the thousands, millions, or billions of data items.

In some implementations, the reward donation platform may determine whether a user characteristic is associated with a likelihood of not paying off a debit balance, as described herein. For example, using historical information, the reward donation platform may determine a likelihood that a user characteristic is associated with failure to pay off a debit balance. In this case, the reward donation platform may generate a recipient-user-identification model. For example, the reward donation platform may train a model using historical information that includes a plurality of user characteristics associated with accounts, a plurality of outcomes of accounts, and/or the like, to identify user characteristics associated with a likelihood of not paying off a debit balance. As an example, the reward donation platform may determine that past user characteristics, are associated with a threshold probability of being associated with a likelihood of not paying off a debit balance. In some implementations, the reward donation platform may use a scoring system (e.g., with relatively high scores and/or relatively low scores) to identify and/or classify user characteristics as being associated with one another. In this case, the reward donation platform may determine that a relatively high score (e.g., as having a high likelihood or a high probability of not paying off a debit balance) is to be assigned to attributes that are determined to be the same or similar to previously identified attributes of the particular user characteristic (or more frequently identified than past identified attributes). In contrast, the reward donation platform may determine that a relatively low score (e.g., as having a low likelihood or a low probability of not paying off a debit balance) is to be assigned to attributes of a user characteristics that are determined to be different than past identified attributes of the particular user characteristics (or less frequently identified than past identified attributes).

In some implementations, the reward donation platform may perform a data preprocessing operation when generating the recipient-user-identification model. For example, the reward donation platform may preprocess data (e.g., historical information for a plurality of users including account information, transaction histories, outcomes of accounts, and/or the like) to remove non-ASCII characters, white spaces, confidential data (e.g., personal information, medical information, and/or the like), and/or the like. In this way, the reward donation platform may organize thousands, millions, or billions of data items for machine learning and model generation.

In some implementations, the reward donation platform may perform a training operation when generating the recipient-user-identification model. For example, the reward donation platform may portion data of the historical information into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the reward donation platform may preprocess and/or perform dimensionality reduction to reduce the data of the historical information to a minimum feature set. In some implementations, the reward donation platform may train the recipient-user-identification model on this minimum feature set, thereby reducing processing to train the recipient-user-identification model, and may apply a classification technique, to the minimum feature set.

In some implementations, the reward donation platform may use a classification technique, such as a logistic regression classification technique, a random forest classification technique, a gradient boosting machine learning (GBM) technique, and/or the like, to determine a categorical outcome (e.g., that a user characteristic is associated with a likelihood of not paying off a debit balance, that a user characteristic is not associated with a likelihood of not paying off a debit balance, and/or the like). Additionally, or alternatively, the reward donation platform may use a naïve Bayesian classifier technique. In this case, the reward donation platform may perform binary recursive partitioning to split the data of the minimum feature set into partitions and/or branches and use the partitions and/or branches to perform predictions (e.g., that a user characteristic is or is not associated with a likelihood of not paying off a debit balance). Based on using recursive partitioning, the reward donation platform may reduce utilization of computing resources relative to manual, linear sorting and analysis of data items, thereby enabling use of thousands, millions, or billions of data items to train a model, which may result in a more accurate model than using fewer data items.

Additionally, or alternatively, the reward donation platform may use a support vector machine (SVM) classifier technique to generate a non-linear boundary between data items in the training set. In this case, the non-linear boundary is used to classify test data (e.g., data relating user characteristics) into a particular class (e.g., a class indicating that the user characteristic has a high likelihood of being associated with not paying off a debit balance, a class indicating that the user characteristic has a low likelihood of being associated with not paying off a debit balance, and/or the like).

Additionally, or alternatively, the reward donation platform may train the recipient-user-identification model using a supervised training procedure that includes receiving input to the model from a subject matter expert, which may reduce an amount of time, an amount of processing resources, and/or the like to train the recipient-user-identification model relative to an unsupervised training procedure. In some implementations, the reward donation platform may use one or more other model training techniques, such as a neural network technique, a latent semantic indexing technique, and/or the like. For example, the reward donation platform may perform an artificial neural network processing technique (e.g., using a two-layer feedforward neural network architecture, a three-layer feedforward neural network architecture, and/or the like) to perform pattern recognition with regard to patterns of whether user characteristics described using different semantic descriptions can be used to determine whether user characteristics are associated with a likelihood of not paying off a debit balance. In this case, using the artificial neural network processing technique may improve an accuracy of a model (e.g., the recipient-user-identification model) generated by the reward donation platform by being more robust to noisy, imprecise, or incomplete data, and by enabling the reward donation platform to detect patterns and/or trends undetectable to human analysts or systems using less complex techniques.

As an example, the reward donation platform may use a supervised multi-label classification technique to train the model. For example, as a first step, the reward donation platform may map parameters to a user characteristic. In this case, the parameters may be characterized as a high likelihood of being associated with not paying off a debit balance or a low likelihood of being associated with not paying off a debit balance based on attributes of the parameters (e.g., whether an attribute of a parameter is similar or associated with an attribute of a parameter of the user characteristic) and an analysis of the parameters (e.g., by a technician, thereby reducing processing relative to the reward donation platform being required to analyze each activity). As a second step, the reward donation platform may determine classifier chains, whereby labels of target variables may be correlated (e.g., in this example, labels may be parameters and correlation may refer to a common characteristic of a user characteristic). In this case, the reward donation platform may use an output of a first label as an input for a second label (as well as one or more input features, which may be other data relating to the user characteristics), and may determine a likelihood that a particular parameter that includes a set of attributes of user characteristics (some of which are associated with a particular user characteristic and some of which are not associated with the particular user characteristic) are associated with the particular user characteristic based on a similarity to other parameters that include similar attributes. In this way, the reward donation platform transforms classification from a multilabel-classification problem to multiple single-classification problems, thereby reducing processing utilization. As a third step, the reward donation platform may determine a Hamming Loss Metric relating to an accuracy of a label in performing a classification by using the validation set of the data. For example, an accuracy with which a weighting applied to each parameter or attribute and whether each parameter or attribute is associated with a user characteristic or not, results in a correct prediction of whether a user characteristic is or is not associated with a likelihood of not paying off a debit balance, thereby accounting for differing amounts to which association of any one parameter or attribute influences a likelihood of not paying off a debit balance. As a fourth step, the reward donation platform may finalize the model based on labels that satisfy a threshold accuracy associated with the Hamming Loss Metric and may use the model for subsequent prediction of whether parameters of a user characteristic are to result in a likelihood of not paying off a debit balance.

As another example, the reward donation platform may determine, using a linear regression technique, that a threshold percentage of user characteristics, in a set of user characteristics, are not associated with a likelihood of not paying off a debit balance, and may determine that those user characteristics are to receive relatively low association scores. In contrast, the reward donation platform may determine that another threshold percentage of user characteristics are associated with a likelihood of not paying off a debit balance and may assign a relatively high association score to those user characteristics. Based on the user characteristics being associated with a likelihood of not paying off a debit balance, the reward donation platform may generate the recipient-user-identification model and may use the recipient-user-identification model for analyzing new user characteristics, and/or the like that the reward donation platform identifies.

In some implementations, a different device, such as a server device, may generate and train the model. The different device may send the model for use by the reward donation platform. The different device may update and send (e.g., on a scheduled basis, on an on-demand basis, on a triggered basis, on a periodic basis, and/or the like) the model to the reward donation platform.

Accordingly, the reward donation platform may use any number of artificial intelligence techniques, machine learning techniques, deep learning techniques, and/or the like to identify user characteristics associated with a likelihood of not paying off a debit balance and analyze user characteristics of users to identify recipient users that have a likelihood of not paying off the debit balances.

In some implementations, the reward donation platform may receive one or more financial-institution selections (e.g., from a device associated with financial institution and/or the like). For example, the financial-institution selections may include a type of account (e.g., a mortgage, a credit card account, a student loan account, and/or the like) having a debit balance that is or is not eligible for the reward donation program, a user characteristic of a recipient user that disqualifies the recipient user from the reward donation program, and/or the like. The reward donation platform may, based on the one or more financial-institution selections, identify recipient users (e.g., from a set of recipient users identified using artificial intelligence techniques, machine learning techniques, deep learning techniques, and/or the like, by updating the recipient-user-identification model, and/or the like).

In some implementations, the reward donation platform may limit the data set of historical information obtained to train the recipient-user-identification model to data specific to users satisfying the one or more financial-institution selections. By limiting the data, the reward donation platform may optimize the data set for determining the likelihood that a user characteristic is associated with not paying off debit balances, which may make efficient use of computing resources. In some implementations, the reward donation platform may not limit the data obtained to data specific to users satisfying the one or more financial-institution selections. By not limiting the data, the reward donation platform may determine one or more other user characteristics that are associated with not paying off debit balances.

As shown in FIG. 1A, and by reference number 110, the reward donation platform may provide, to a recipient user device associated with an identified recipient user, a notification requesting that the recipient user enroll in a reward donation program (e.g., to be eligible to receive donations to reduce debit balances). In some implementations, the reward donation platform may provide the notification via a push notification in an application (e.g., a mobile banking application and/or the like), a text message, an email, an interactive voice response (IVR) based phone call, and/or the like. For example, after identifying the recipient user as having a likelihood of not paying off a debit balance of one or more accounts, the reward donation platform may transmit an email to an email account associated with the recipient user, where the email provides information regarding the reward donation program and instructions for enrolling in the reward donation program.

As shown in FIG. 1A, and by reference number 115, the recipient user device may prompt the recipient user to complete a recipient profile. In some implementations, the recipient profile may include personal information regarding the recipient user, such as family characteristics (e.g., whether the recipient user is married, whether the recipient user has any children, whether the recipient user has any dependents, ages and/or genders of spouse, children, and/or dependents, and/or the like), health information (e.g., number of days of exercise per week, major surgeries, disease diagnoses, use of tobacco products, family medical history, and/or the like), job information (e.g., type of job, salary, hourly wage, hours per week, years of employment, job history, and/or the like), hobbies (e.g., sports played and/or watched, recreational activities, and/or the like), and/or the like.

In some implementations, the recipient profile may include a section for identifying debts of the recipient user. For example, the recipient user device may request information regarding mortgage accounts, credit card accounts, auto loan accounts, personal loan accounts, education loan accounts, vehicle loan accounts, medical accounts (e.g., hospital accounts, doctor accounts, and/or the like), and/or the like. The requested information may include account balances, initial balances, monthly payment amounts, interest rates, and/or the like.

In some implementations, the recipient profile may include a section for the recipient user to link accounts to the reward donation program (e.g., to provide proof of the financial history of the recipient user and/or the like). For example, the recipient user device may request that the recipient user link mortgage accounts, credit card accounts, auto loan accounts, personal loan accounts, education loan accounts, vehicle loan accounts, medical accounts, and/or the like by providing authentication credentials (e.g., usernames, passwords, and/or the like) and authorization to access the accounts.

As shown in FIG. 1A, and by reference number 120, the recipient user device may provide the recipient profile and enrollment information to the reward donation platform. In some implementations, the reward donation platform may analyze information in the recipient profile and/or information obtained by accessing linked accounts of the recipient user (e.g., to confirm that the recipient user is eligible for the reward donation program). For example, the reward donation platform may analyze information in the recipient profile and/or information obtained by accessing linked accounts of the recipient user to identify user characteristics of the recipient user, and use the identified user characteristics as additional inputs to the recipient-user-identification model to determine whether the recipient user has a likelihood of not paying off one or more debit balances. If, based on the information in the recipient profile and/or information obtained by accessing linked accounts of the recipient user, the recipient user has a likelihood of not paying off one or more debit balances, the reward donation platform may enroll the recipient user in the reward donation program. If, based on the information in the recipient profile and/or information obtained by accessing linked accounts of the recipient user, the recipient user does not have a likelihood of not paying off one or more debit balances, the reward donation platform may provide a notification to the recipient user device that the recipient user is not eligible for the reward donation program.

Figure 1B:
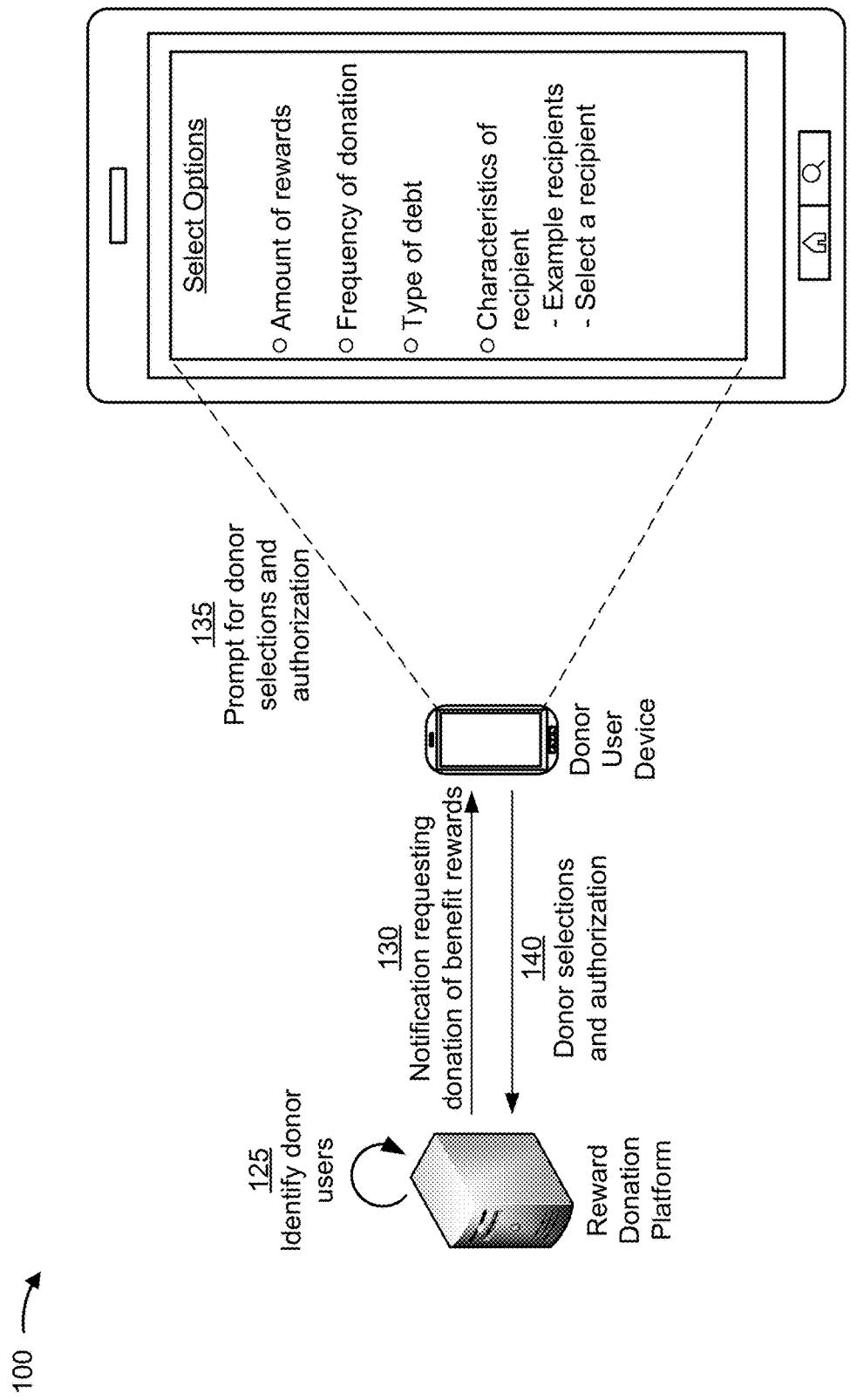

As shown in FIG. 1B, and by reference number 125, the reward donation platform may identify donor users with benefit accounts having credit balances. In some implementations, the reward donation platform may identify users as donor users based on a length of a time period since a user redeemed a benefit reward. For example, if a user has not redeemed a benefit reward in at least six months, a year, and/or the like, the reward donation platform may identify the user as a donor user.

In some implementations, the reward donation platform may identify users as donor users based on a threshold credit balance of a benefit account. For example, if a user has a benefit account with a credit balance satisfying a threshold (e.g., a benefit reward total of greater than 100 rewards, a benefit reward total having a value greater than $500, and/or the like), the reward donation platform may identify the user as a donor user.

In some implementations, the reward donation platform may identify users as donor users based on a combination of information. For example, if a user has not redeemed a benefit reward for some time period (e.g., at least six months, a year, and/or the like) and has a benefit account with a credit balance satisfying a threshold (e.g., a benefit reward total of greater than 100 rewards, a benefit reward total having a value greater than $500, and/or the like), the reward donation platform may identify the user as a donor user.

In some implementations, the reward donation platform may identify a user as a donor user based on a likelihood that the user will donate a portion of the credit balance. For example, the reward donation platform may use one or more artificial intelligence techniques, such as machine learning, deep learning, and/or the like, as described herein, to identify donor users that have a likelihood of donating a portion of the credit balance. In some implementations, the reward donation platform may use a machine learning model, such as a donor-user-identification model, to identify donor users that have a likelihood of donating a portion of the credit balance. The reward donation platform may train the donor-user-identification model using one or more techniques similar to those techniques described above with regard to training the recipient-user-identification model. In this case, the reward donation platform may train the donor-user-identification model based on one or more user characteristics associated with a likelihood of donating, such as transactions with non-profit organizations, charitable donations, and/or the like. The reward donation platform may train the donor-user-identification model using historical data associated with user transactions, donations, and/or users that have already donated portions of credit balances according to the one or more user characteristics. Using the historical data and the one or more user characteristics as inputs to the donor-user-identification model, the reward donation platform may identify user characteristics associated with a likelihood of donating and analyze user characteristics of users to identify donor users that have a likelihood of donating.

In some implementations, a different device, such as a server device, may generate and train the model. The different device may send the model for use by the reward donation platform. The different device may update and send (e.g., on a scheduled basis, on an on-demand basis, on a triggered basis, on a periodic basis, and/or the like) the model to the reward donation platform.

Accordingly, the reward donation platform may use any number of artificial intelligence techniques, machine learning techniques, deep learning techniques, and/or the like to identify donor users that have a likelihood of donating a portion of the credit balance.

As shown in FIG. 1B, and by reference number 130, the reward donation platform may provide, to a donor user device associated with an identified donor user, a notification requesting the donation of benefit rewards via the reward donation program. In some implementations, the reward donation platform may provide the notification via a push notification in an application (e.g., a mobile banking application and/or the like), a text message, an email, an interactive voice response (IVR) based phone call, and/or the like. For example, after identifying the donor user as having a likelihood of donating, the reward donation platform may transmit an email to an email account associated with the donor user, where the email provides information regarding the reward donation program and instructions for donating benefit rewards.

As shown in FIG. 1B, and by reference number 135, the donor user device may prompt the donor user to select options regarding donating benefit rewards and to provide authorization to use a portion of the credit balance from the benefit account. In some implementations, the donor user device may prompt the user to select options regarding the amount of benefit rewards to donate (e.g., a dollar amount, a number of benefit rewards, benefit rewards valued over $100 earned per month, and/or the like), a frequency of donation (e.g., monthly, yearly, each time benefit rewards exceed a value of $2,000, and/or the like), and/or the like.

In some implementations, the donor user device may prompt the user to select a matching option, where the donor user may select to match a portion of a payment made by a recipient user with benefit rewards. For example, the donor may select to donate benefit rewards equivalent to a percentage (e.g., 100 percent, 75 percent, 50 percent, 30 percent, and/or the like) of a payment amount each time the recipient user makes a payment to the account having the debit balance. In this way, the reward donation platform may permit the donor user to provide the recipient user with an incentive to make payments to the account having the debit balance.

In some implementations, the donor user device may prompt the user to select a type of debt for which the donor user would like the donated benefit rewards to be used to reduce. For example, the donor user device may provide the user with options of types of debt, such as credit card debt, mortgage debt, education loan debt, vehicle loan debt, medical bill debt, personal loan debt, and/or the like. In some implementations, the user may select one or more types of debt for which the donated benefit rewards may be used and/or one or more types of debt for which the donated benefit rewards may not be used.

In some implementations, the donor user device may prompt the user to select characteristics of recipient users to whom the donor user would like to donate the benefit rewards or to whom the donor user would not like to donate the benefit rewards. For example, the donor user device may provide the user with a list of characteristics (without revealing any personal information of actual recipient users), such as family characteristics, health information, job information, hobbies, and/or the like. In this way, the donor user device may receive selections from the donor user that may be used (e.g., by the reward donation platform) to identify, based on the selections, a subset of recipient users that may receive donated benefit rewards from the donor user.

Additionally, or alternatively, the donor user device may prompt the user to select an example recipient from a list of example recipients by displaying a profile for each example recipient, where the profile includes information describing the example recipient (e.g., family characteristics, health information, job information, hobbies, a narrative describing the example recipient, how the example recipient went into debt, and/or the like) without revealing personal information of the example recipient. The example recipients may not identify specific recipient users and, rather, may generically describe a group of recipient users.

Additionally, or alternatively, the donor user device may prompt the user to select a recipient user from a list of recipient users by displaying a profile for each recipient user, where the profile includes information describing the recipient user (e.g., family characteristics, health information, job information, hobbies, a narrative describing the recipient user, how the recipient user went into debt, and/or the like) without revealing personal information of the recipient user. The list of recipient users may include recipient users identified by the reward donation platform that completed a recipient profile and enrolled in the reward donation program. To maintain confidentiality of personal information and/or the like, the list of recipient users may include aliases for the recipient users, rather than real names, and the profiles may exclude any sensitive information provided by the recipient users to the reward donation platform.

As shown in FIG. 1B, and by reference number 140, the donor user device may provide, to the reward donation platform, the donor selections and the authorization to use a portion of the credit balance from the benefit account. The reward donation may process the donor selections and enroll the donor user in the reward donation program as a donor. For example, the reward donation may process the donor selections and, based on the donor selections, confirm that the reward donation platform is authorized to use a portion of the credit balance from the benefit account of the donor user to reduce the debit balance of the account of the recipient user.

Figure 1C:
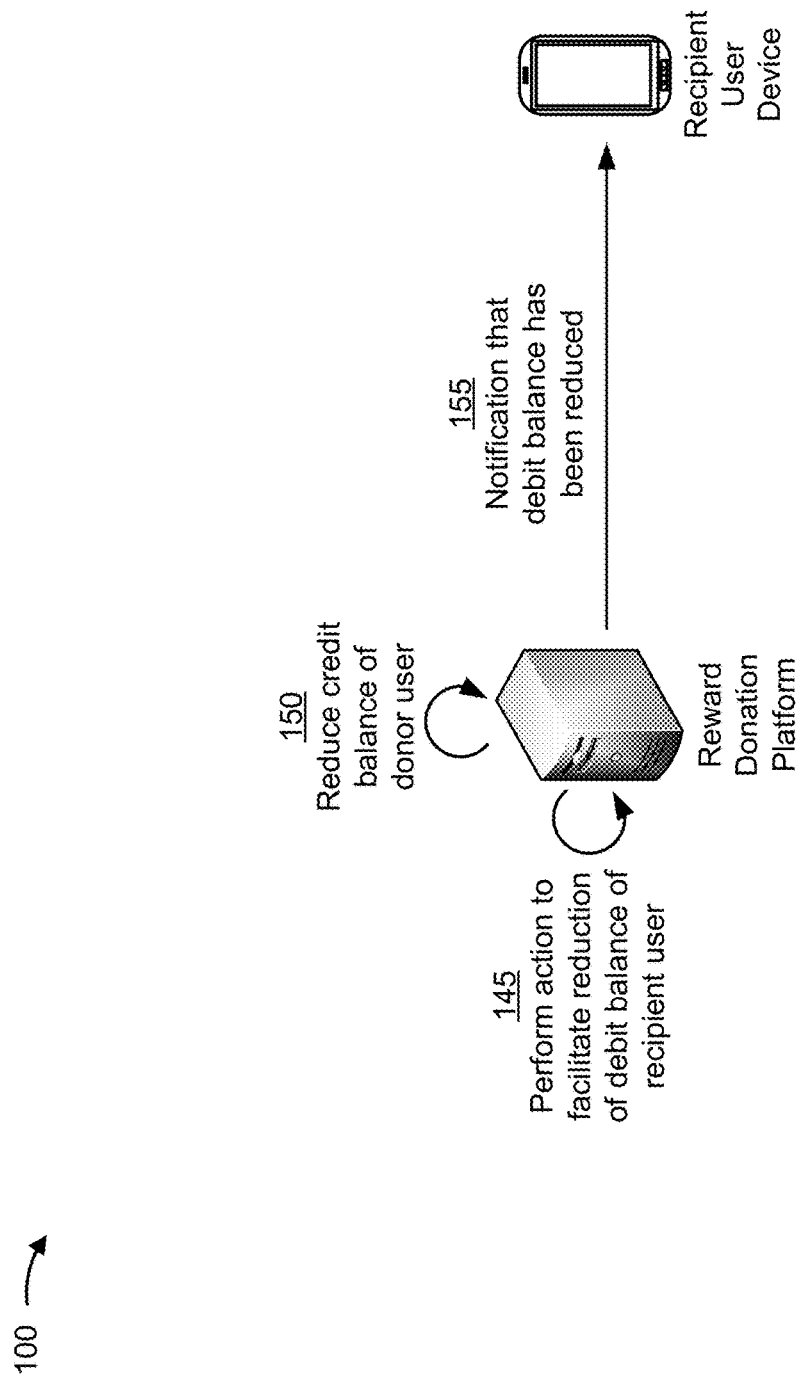

As shown in FIG. 1C, and by reference number 145, the reward donation platform may perform an action to facilitate reduction of the debit balance of the account of the recipient user. In some implementations, the action may include reducing the debit balance of the account of the recipient user by an amount equivalent to the amount of benefit rewards to donate selected by the donor user. For example, if the donor user selected to donate $500 worth of benefit rewards, the action may include reducing the debit balance of the account of the recipient user by $500.

In some implementations, the reward donation platform may perform an action to use a portion of the credit balance to eliminate a portion of or a total of the debit balance of the account. For example, if the debit balance of the account of the recipient user is $200 and the donor user selected to donate $300 worth of benefit rewards, the action may include eliminating the total of the debit balance.

In some implementations, the reward donation platform may perform an action to use a portion of the credit balance to reduce the debit balance of the account by an amount corresponding to a portion of or a total of late payments. For example, if the recipient user has missed three payments on a mortgage totaling $1,800 and the donor user has authorized the reward donation platform to use a portion of the credit balance to pay off any late payments, the reward donation platform may use a portion of the credit balance to reduce the debit balance of the account by $1,800.

In some implementations, the reward donation platform may perform an action to use a portion of the credit balance to reduce the debit balance of the account by an amount corresponding to a portion of or a total of a payment due but unpaid. For example, if the recipient user has established a payment plan for a medical bill that requires $120 monthly payments but has not made one of the monthly payments that is due, the reward donation platform may use a portion of the credit balance to reduce the debit balance of the account by $120.

In some implementations, the action may include reducing the debit balance of the account of the recipient user by an amount that is a fraction (e.g., a quarter, one third, one half, and/or the like) or a multiple (e.g., double, triple, and/or the like) of the amount of benefit rewards to donate selected by the donor user. For example, if the donor user selected to donate $300 worth of benefit rewards, the action may include reducing the debit balance of the account of the recipient user by $600.

In some implementations, the action may include flagging the account of the recipient user as eligible for a reduction in the debit balance. For example, if the donor user selected to donate benefit rewards each time the recipient user makes a payment to the account having the debit balance, the reward donation platform may flag the account as eligible for a reduction in the debit balance. Additionally, or alternatively, the action may include providing a notification to the recipient user that the account having the debit balance is eligible for a reduction. In some implementations, the action may further include receiving information indicating that the recipient user made a payment to the account having the debit balance and reducing the debit balance of the account of the recipient user based on the received information.

As shown in FIG. 1C, and by reference number 150, the reward donation platform may reduce the credit balance of the benefit account of the donor user. In some implementations, the reward donation platform may reduce the credit balance of the benefit account by an amount equivalent to the amount of benefit rewards to donate selected by the donor user. In this way, the reward donation platform may facilitate the maintenance of an accurate balance in the benefit account of the donor user, which may conserve financial resources, computing resources (e.g., processing resources, memory resources, power resources, communication resources, and/or the like), and/or network resources that would otherwise be used by financial institutions to identify, investigate, mitigate, and/or the like an inaccurate balance in the benefit account of the donor user.

As shown in FIG. 1C, and by reference number 155, the reward donation platform may provide, to the recipient user device, a notification that the debit balance has been reduced. In some implementations, the reward donation platform may provide the notification via a push notification in an application (e.g., a mobile banking application and/or the like), a text message, an email, and/or the like. For example, the reward donation platform may provide the notification via an email including information regarding the reduction in the debit balance (e.g., an amount by which the debit balance has been reduced, information regarding the donor user, and/or the like). In some implementations, the reward donation platform may process information regarding the donor user to remove, mask, anonymize, and/or the like sensitive information (e.g., personal information, confidential information, and/or the like).

Figure 1D:
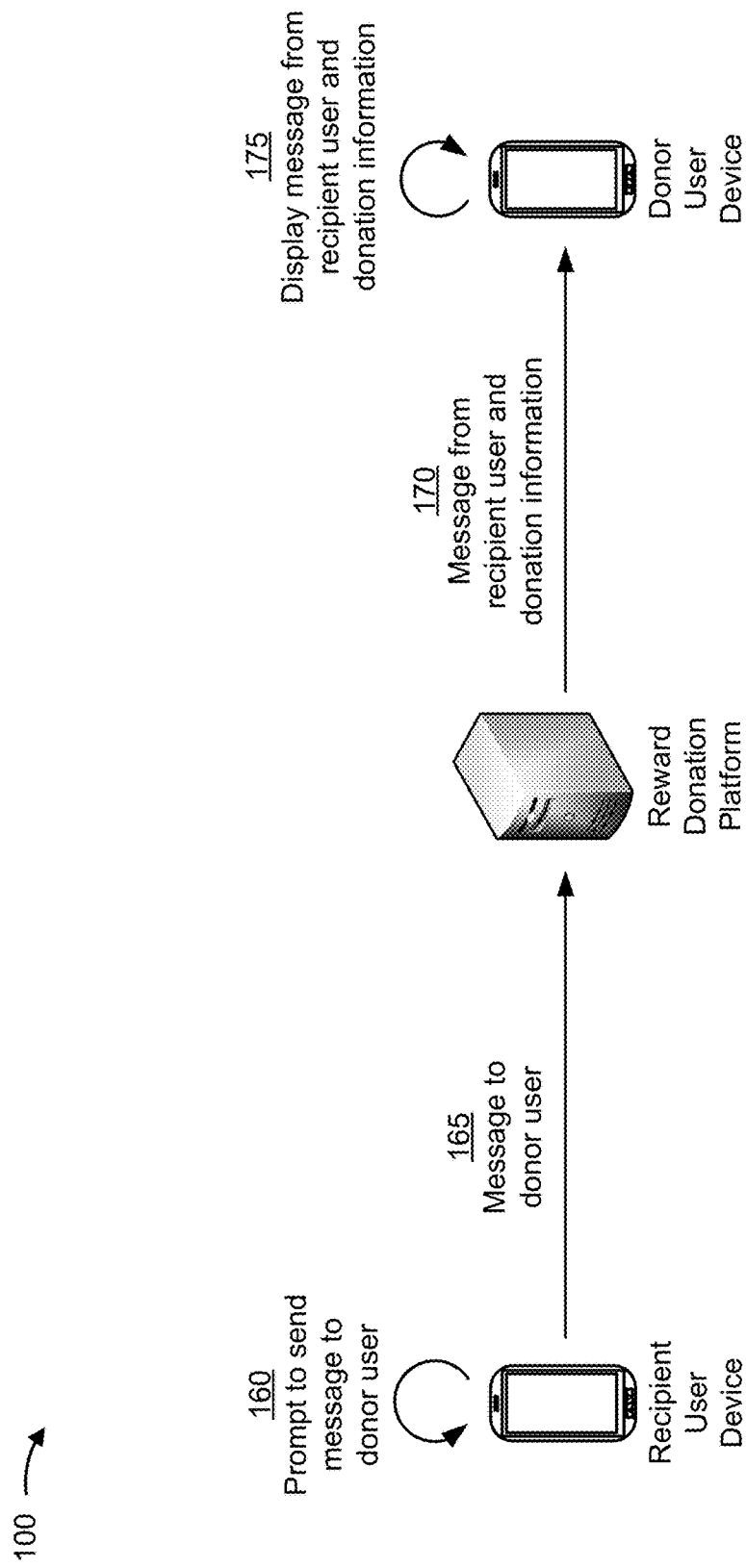

As shown in FIG. 1D, and by reference number 160, the recipient user device may prompt the recipient user to send a message to the donor user. In some implementations, the prompt may include a user interface for composing and sending a message to the donor user. For example, the user interface may include a field for composing the message that is pre-populated with example text for the recipient user to include in the message.

As shown in FIG. 1D, and by reference number 165, the recipient user device may provide, to the reward donation platform, the message to the donor user. In some implementations, the reward donation platform may process the message to remove, mask, anonymize, and/or the like sensitive information (e.g., personal information, medical information, confidential information, and/or the like) in the message.

As shown in FIG. 1D, and by reference number 170, the reward donation platform may provide, to the donor user device, the message from the recipient user and donation information. In some implementations, the reward donation platform may provide the message and the donation information via a message in an application (e.g., a mobile banking application and/or the like), a text message, an email, and/or the like. The donation information may include the amount of benefit rewards donated, the amount by which the debit balance was reduced, the type of debt that was reduced, characteristics of the recipient user, a profile of the recipient user, and/or the like.

As shown in FIG. 1D, and by reference number 175, the donor user device may display the message from the recipient user and the donation information. In some implementations, the donor user device may display the message from the recipient user and the donation information in an application (e.g., a mobile banking application and/or the like), a text message, an email, and/or the like. For example, the donor user device may, based on receiving, from the reward donation platform, the message from the recipient user and the donation information, provide a notification via a mobile banking application, and, based on the donor user opening the notification, display the message from the recipient user and the donation information. In this way, the reward donation platform may create a positive feedback loop between the recipient user and the donor user that may encourage the donor user to donate additional benefit rewards and/or encourage the recipient user to reduce the debit balance of the account.

In some implementations, the reward donation platform may, before providing information, process the information regarding the donor user being provided to the recipient user and/or the information regarding the recipient user being provided to the donor user to remove, mask, anonymize, and/or the like sensitive information (e.g., personal information, confidential information, and/or the like). Additionally, or alternatively, the reward donation platform may receive, from the donor user and/or the recipient user, authorization to provide sensitive information, types of sensitive information (e.g., first name only, initials only, state of residence, age, and/or the like), and/or the like.

In some implementations, the reward donation platform may identify additional recipient users to whom the donor user is likely to donate and request authorization to use a portion of the credit balance from the benefit account of the donor user to reduce the debit balances of the accounts of the additional recipient users. For example, the reward donation platform may use one or more artificial intelligence techniques, such as machine learning, deep learning, and/or the like, as described herein, to identify additional recipient users to whom the donor user is likely to donate. In some implementations, the reward donation platform may use a machine learning model, such as a similar-recipient-user-identification model, to identify additional recipients to whom the donor user is likely to donate. The reward donation platform may train the similar-recipient-user-identification model using one or more techniques similar to those techniques described above with regard to training the recipient-user-identification model. In this case, the reward donation platform may train the similar-recipient-user-identification model based on one or more recipient user characteristics associated with a likelihood of receiving a donation from the donor user, such as user characteristics selected by the donor user, family characteristics of the recipient user, health information of the recipient user, job information of the recipient user, hobbies of the recipient user, and/or the like. The reward donation platform may train the similar-recipient-user-identification model using historical data regarding recipient users to whom the donor user has previously donated according to the one or more recipient user characteristics. Using the historical data and the one or more recipient user characteristics as inputs to the similar-recipient-user-identification model, the reward donation platform may identify recipient user characteristics associated with a likelihood of receiving a donation from the donor user.

In some implementations, a different device, such as a server device, may generate and train the model. The different device may send the model for use by the reward donation platform. The different device may update and send (e.g., on a scheduled basis, on an on-demand basis, on a triggered basis, on a periodic basis, and/or the like) the model to the reward donation platform.

Accordingly, the reward donation platform may use any number of artificial intelligence techniques, machine learning techniques, deep learning techniques, and/or the like to identify additional recipient users to whom the donor user is likely to donate.

In some implementations, the reward donation platform may identify additional recipient users to whom the donor user is likely to donate based on a trigger event resulting in the recipient users permitting an account to have a debit balance, such as a medical bill, birth of a child, a vehicle repair bill, a home repair bill, and/or the like. For example, the reward donation platform may use one or more artificial intelligence techniques, such as machine learning, deep learning, and/or the like, as described herein, to identify a trigger event resulting in a recipient user permitting the account to have a debit balance. In some implementations, the reward donation platform may use a machine learning model, such as a trigger-event-identification model, to identify the trigger event resulting in the recipient user permitting the account to have a debit balance. The reward donation platform may train the trigger-event-identification model using one or more techniques similar to those techniques described above with regard to training the recipient-user-identification model. In this case, the reward donation platform may train the trigger-event-identification model based on one or more transaction characteristics associated with a likelihood of resulting in recipient users permitting accounts to have debit balances, such as an amount of a transaction, a type of goods and/or services associated with the transaction (e.g., diapers, medical services, vehicle repair services, home repair supplies, home repair services, and/or the like), a type of merchant associated with the transaction (e.g., a retail store, a grocery store, a medical service provider, a vehicle repair shop, a construction contractor, and/or the like), and/or the like. The reward donation platform may train the trigger-event-identification model using historical data regarding recipient users that have permitted accounts to have debit balances according to the one or more transaction characteristics. Using the historical data and the one or more transaction characteristics as inputs to the trigger-event-identification model, the reward donation platform may identify transaction characteristics associated with a likelihood of resulting in recipient users permitting accounts to have debit balances.

In some implementations, a different device, such as a server device, may generate and train the model. The different device may send the model for use by the reward donation platform. The different device may update and send (e.g., on a scheduled basis, on an on-demand basis, on a triggered basis, on a periodic basis, and/or the like) the model to the reward donation platform.

Accordingly, the reward donation platform may use any number of artificial intelligence techniques, machine learning techniques, deep learning techniques, and/or the like to identify additional recipient users to whom the donor user is likely to donate based on a trigger event resulting in the recipient users permitting an account to have a debit balance.

In some implementations, the reward donation platform may process, based on the transaction characteristics associated with a likelihood of resulting in recipient users permitting accounts to have debit balances, information regarding the transaction history of recipient user to whom the donor user has donated to identify a trigger event resulting in the recipient user permitting the account to have a debit balance. The reward donation platform may process the transaction histories of other recipient users to identify trigger events resulting in the other recipient users permitting accounts to have debit balances. The reward donation platform may then request authorization to use a portion of the credit balance from the benefit account of the donor user to reduce the debit balances of the accounts of other recipient users having the same trigger event. In this way, the reward donation platform may identify recipient users to whom the donor user is likely to donate based on the trigger event.

In some implementations, the reward donation platform may provide, to the donor user device, information regarding donations made by the donor user. For example, the information may include total amounts of benefit rewards donated, monthly amounts of benefit rewards donated, frequency of donations, number of recipient users that have received donations, number of recipient users that have eliminated debit balances with the help of donated benefit rewards, and/or the like.

In some implementations, the reward donation platform may provide, to the donor user device, information comparing donations made by the donor user and donations made by other donor users. For example, the reward donation platform may provide, to the donor user device, a list ranking the donor user and other donor users based on amounts of credit balances donated, number of donations made, debit balances eliminated by donations, recipient users receiving donations, and/or the like. Additionally, or alternatively, the reward donation platform may provide, to the user device, benefit rewards, discounts, coupons, virtual rewards (e.g., a virtual badge, a virtual trophy, and/or the like), physical rewards (e.g., a free item, a trophy, a certificate, and/or the like), and/or the like.

In some implementations, the reward donation platform may provide, to the recipient user device, information regarding donations made to the recipient user. For example, the information may include total amounts of donations received, monthly amounts of donations received, number of donor users that have donated to the recipient user, number of donations received, and/or the like.

In some implementations, the reward donation platform may identify a pool of recipient users and a pool of donor users. For example, the reward donation platform may use the recipient-user-identification model to identify multiple recipient users that have a likelihood of not paying off the debit balances to enroll in the reward donation program and create the pool of recipient users. The reward donation platform may use the donor-user-identification model to identify multiple donor users that have a likelihood of donating portions of credit balances to enroll in the reward donation program and create the pool of donor users. The reward donation platform may use an algorithm to apply the benefit rewards donated by the pool of donor users to the debit balances of the pool of recipient users.

In some implementations, the reward donation platform may use an algorithm that serially applies donated benefit rewards to the debit balances of the pool of recipient users. For example, the reward donation platform may determine a series for the recipient users based on a factor and/or a combination of factors, such as likelihood of not paying off the debit balance, amount of the debit balance, type of debt, age of debt, and/or the like. The reward donation platform may use all or a portion of the donated benefit rewards from the pool of donor users to reduce a debit balance of a first recipient user in the series (e.g., to eliminate the debit balance, to pay off any overdue payments, and/or the like), and, if there are still donated benefit rewards from the pool of donor users that have not been used, the reward donation platform may use all or a portion of the remaining donated benefit rewards to reduce a debit balance of a second recipient user in the series.

In some implementations, the reward donation platform may use an algorithm that uses donated benefit rewards to reduce the debit balances of the pool of recipient users in parallel. For example, the reward donation platform may use an equal number of benefit rewards donated by the pool of donor users to reduce the debit balances of the recipient users in the pool of recipient users (e.g., $100 worth of benefit rewards per recipient user, $100 worth of benefit rewards per month per recipient user, and/or the like).

By facilitating and/or encouraging donor users to donate benefit rewards to be used to reduce debit balances of accounts of recipient users, the reward donation platform may conserve financial resources, computing resources (e.g., processing resources, memory resources, power resources, communication resources, and/or the like), and/or network resources required by financial institutions to service, analyze, and/or collect on accounts having debit balances, because the debit balances may be reduced and/or eliminated. Additionally, or alternatively, the reward donation platform may conserve financial resources associated with the liability of unclaimed credit balances as well as computing resources (e.g., processing resources, memory resources, power resources, communication resources, and/or the like), and/or network resources consumed to market benefit programs to benefit account holders to encourage use of credit balances.

As indicated above, FIGS. 1A-1D are provided as one or more examples. Other examples may differ from what is described with regard to FIGS. 1A-1D.

Figure 2:
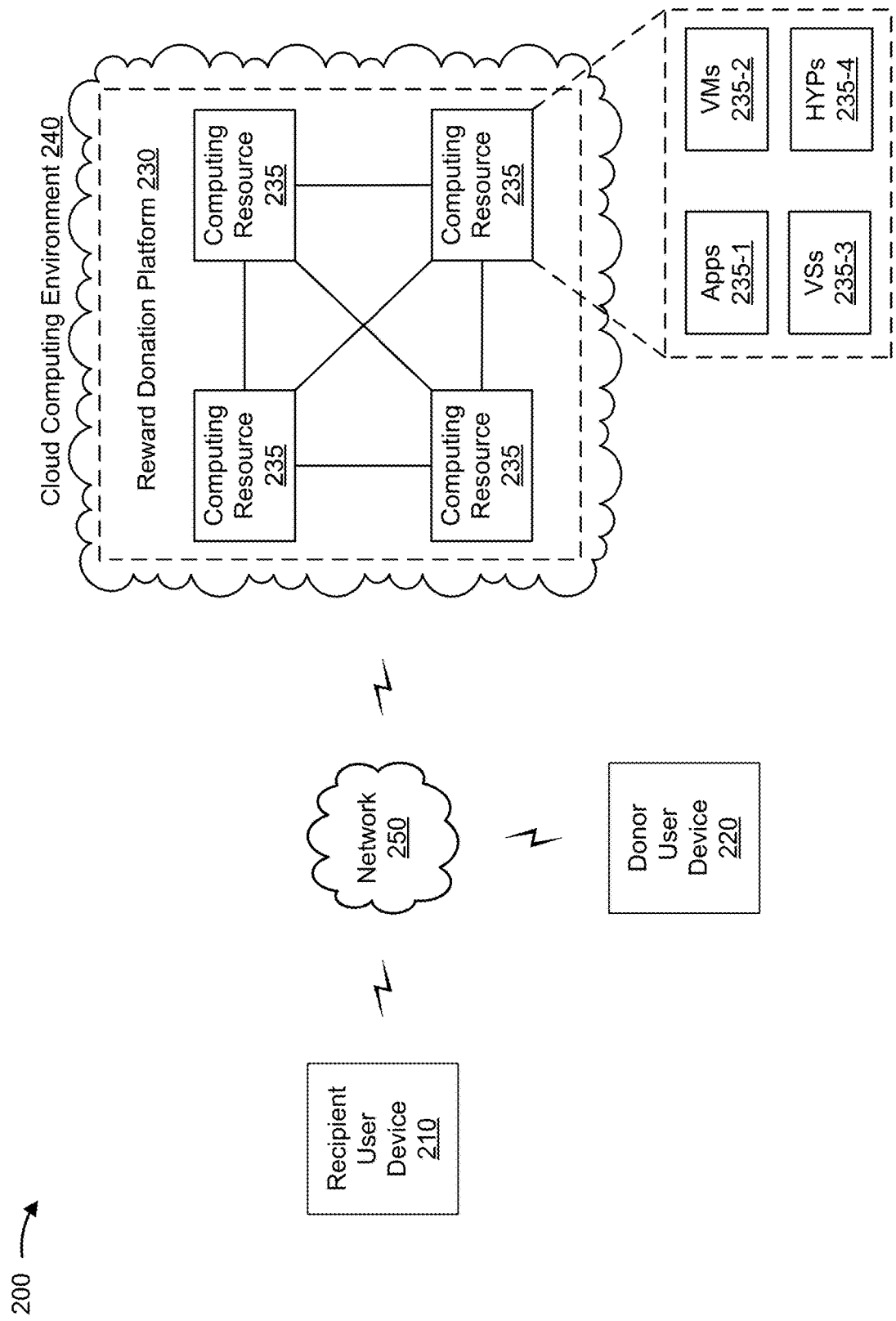
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a recipient user device 210, a donor user device 220, a reward donation platform 230, a computing resource 235, a cloud computing environment 240, and a network 250. Devices of environment 200 may interconnect via wired connections, wireless connections, or a combination of wired and wireless connections.

Recipient user device 210 includes one or more devices capable of receiving, generating, storing, processing, displaying, and/or providing information associated with characteristics of a recipient user, financial accounts, messages, and/or the like. For example, recipient user device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Donor user device 220 includes one or more devices capable of receiving, generating, storing, processing, displaying, and/or providing information associated with benefit accounts, donation settings, characteristics of a recipient user, financial accounts, messages, and/or the like. For example, donor user device 220 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Reward donation platform 230 includes one or more computing resources assigned to receive, from the recipient user device 210 and/or the donor user device 220, information (e.g., benefit account information, financial account information, characteristics of a recipient user, characteristics of a donor user, and/or the like), process the information, identify, based on the information, donor users and/or recipient users, receive authorization from donor users, perform actions to facilitate donations of credit from benefit accounts to reduce debit balances, provide notifications and/or messages to the recipient user device 210 and/or the donor user device 220, and/or the like. For example, reward donation platform 230 may be a platform implemented by cloud computing environment 240 that may receive, generate, store, process, and/or provide information related to benefit accounts, financial accounts, characteristics of users, and/or the like. In some implementations, reward donation platform 230 is implemented by computing resources 235 of cloud computing environment 240.

Reward donation platform 230 may include a server device or a group of server devices. In some implementations, reward donation platform 230 may be hosted in cloud computing environment 240. Notably, while implementations described herein may describe reward donation platform 230 as being hosted in cloud computing environment 240, in some implementations, reward donation platform 230 may be non-cloud-based or may be partially cloud-based.

Cloud computing environment 240 includes an environment that delivers computing as a service, whereby shared resources, services, and/or the like may be provided to recipient user device 210, donor user device 220, and/or reward donation platform 230. Cloud computing environment 240 may provide computation, software, data access, storage, and/or other services that do not require end-user knowledge of a physical location and configuration of a system and/or a device that delivers the services. As shown, cloud computing environment 240 may include reward donation platform 230 and/or computing resource 235.

Computing resource 235 includes one or more personal computers, workstation computers, server devices, or another type of computation and/or communication device. In some implementations, computing resource 235 may host reward donation platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by recipient user device 210, donor user device 220, and/or reward donation platform 230. Application 235-1 may eliminate a need to install and execute the software applications on recipient user device 210, donor user device 220, and/or reward donation platform 230. For example, application 235-1 may include software associated with reward donation platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of a user (e.g., recipient user device 210, donor user device 220, and/or reward donation platform 230), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the "guest operating systems" and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
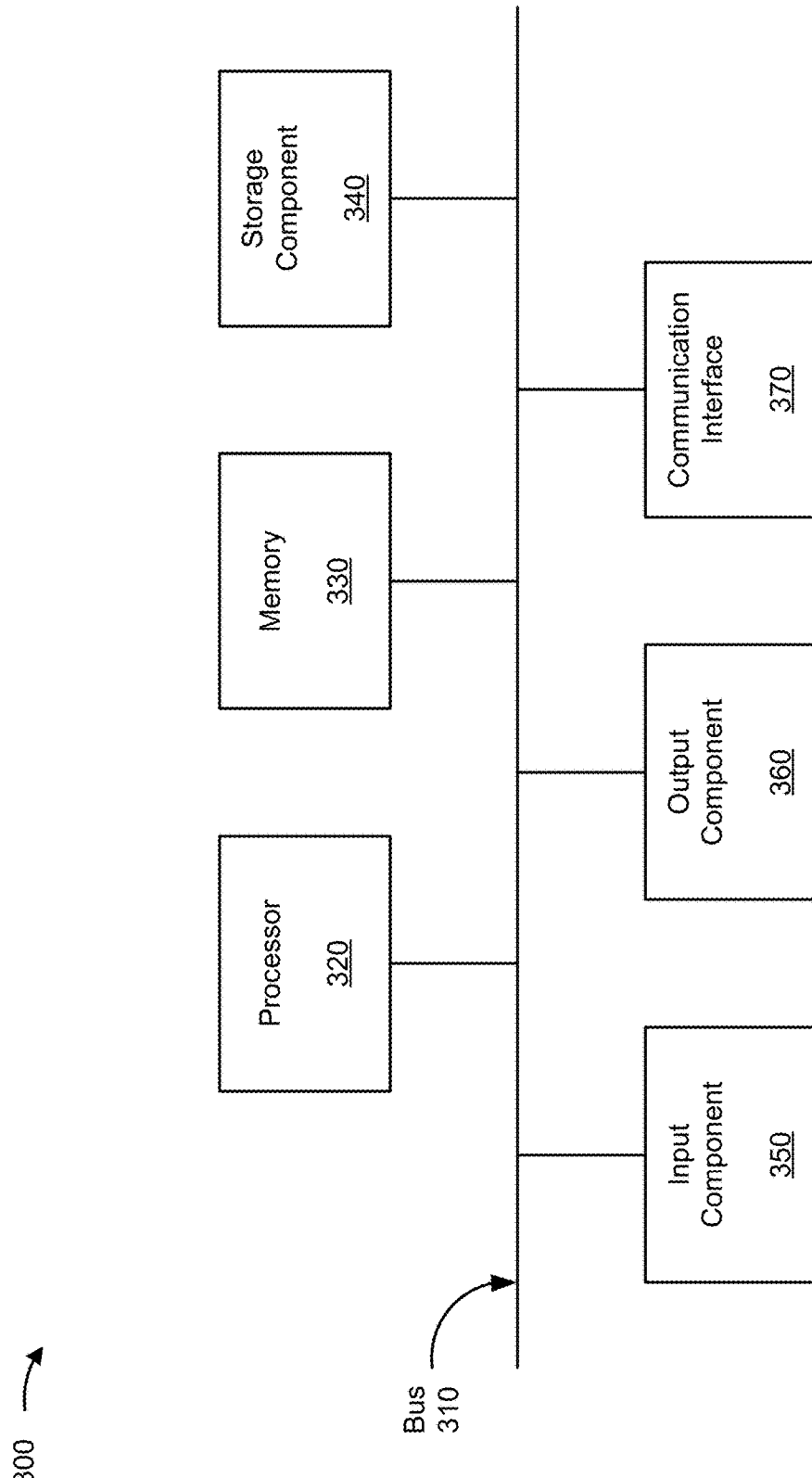
FIG. 3 is a diagram of example components of one or more devices of FIG. 2.

FIG. 3 is a diagram of example components of a device 300. Device 300 may correspond to recipient user device 210, donor user device 220, and/or computing resource 235. In some implementations, recipient user device 210, donor user device 220, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
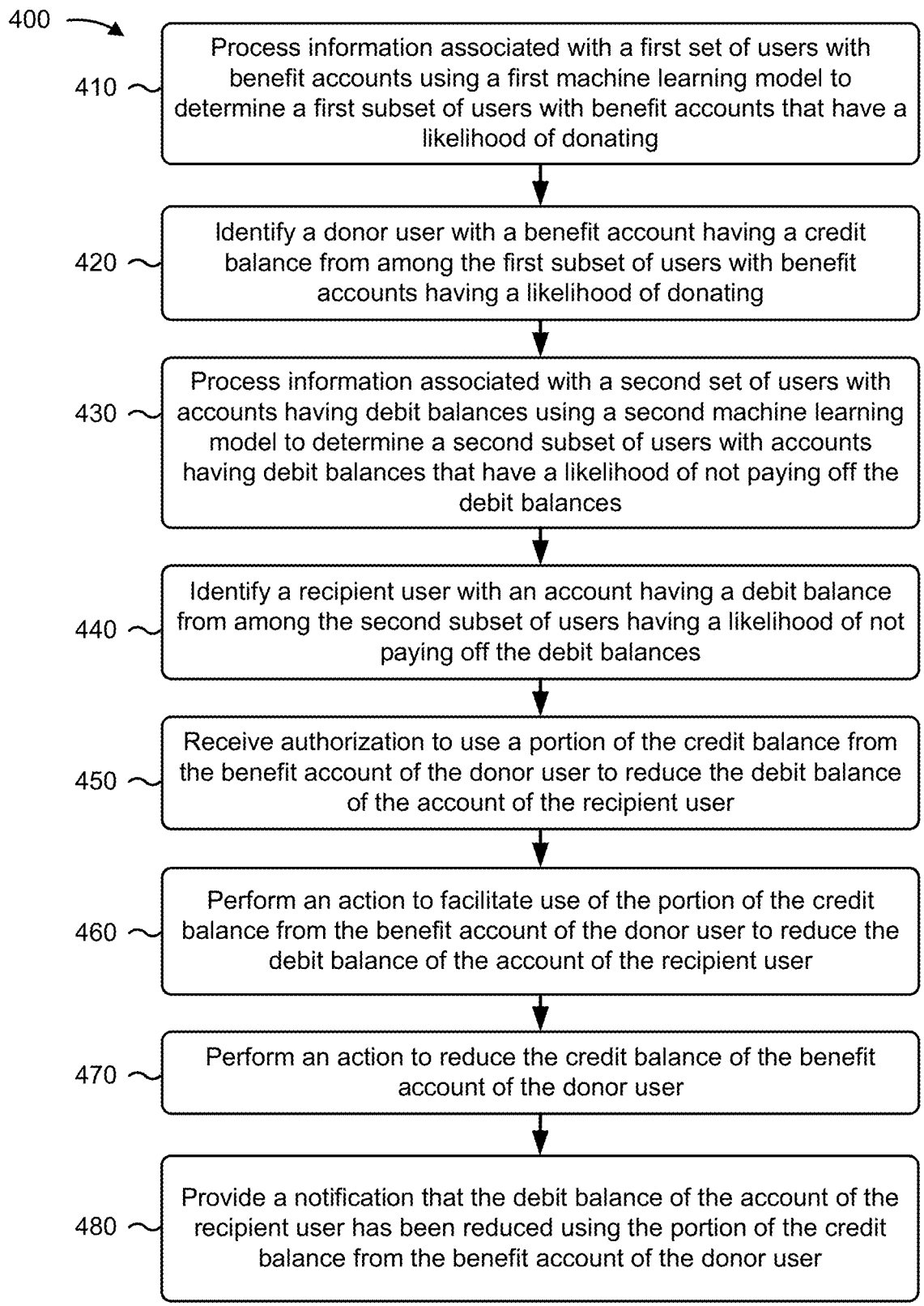
FIGS. 4-6 are flowcharts of example processes for donating benefit account rewards.

FIG. 4 is a flow chart of an example process 400 for donating benefit account rewards. In some implementations, one or more process blocks of FIG. 4 may be performed by a first device (e.g., reward donation platform 230). In some implementations, one or more process blocks of FIG. 4 may be performed by another device or a group of devices separate from or including the first device, such as a recipient user device (e.g., recipient user device 210), a donor user device (e.g., donor user device 220), and/or the like.

As shown in FIG. 4, process 400 may include processing information associated with a first set of users with benefit accounts using a first machine learning model to determine a first subset of users with benefit accounts that have a likelihood of donating (block 410). For example, the first device (e.g., using computing resource 235, processor 320, memory 330, storage component 340, input component 350, output component 360, communication interface 370, and/or the like) may process information associated with a first set of users with benefit accounts using a first machine learning model to determine a first subset of users with benefit accounts that have a likelihood of donating, as described above.

As further shown in FIG. 4, process 400 may include identifying a donor user with a benefit account having a credit balance from among the first subset of users with benefit accounts having a likelihood of donating (block 420). For example, the first device (e.g., using computing resource 235, processor 320, memory 330, storage component 340, input component 350, output component 360, communication interface 370, and/or the like) may identify a donor user with a benefit account having a credit balance from among the first subset of users with benefit accounts having a likelihood of donating, as described above.

As further shown in FIG. 4, process 400 may include processing information associated with a second set of users with accounts having debit balances using a second machine learning model to determine a second subset of users with accounts having debit balances that have a likelihood of not paying off the debit balances (block 430). For example, the first device (e.g., using computing resource 235, processor 320, memory 330, storage component 340, input component 350, output component 360, communication interface 370, and/or the like) may process information associated with a second set of users with accounts having debit balances using a second machine learning model to determine a second subset of users with accounts having debit balances that have a likelihood of not paying off the debit balances, as described above.

As further shown in FIG. 4, process 400 may include identifying a recipient user with an account having a debit balance from among the second subset of users having a likelihood of not paying off the debit balances (block 440). For example, the first device (e.g., using computing resource 235, processor 320, memory 330, storage component 340, input component 350, output component 360, communication interface 370, and/or the like) may identify a recipient user with an account having a debit balance from among the second subset of users having a likelihood of not paying off the debit balances, as described above.

As further shown in FIG. 4, process 400 may include receiving authorization to use a portion of the credit balance from the benefit account of the donor user to reduce the debit balance of the account of the recipient user (block 450). For example, the first device (e.g., using computing resource 235, processor 320, memory 330, storage component 340, input component 350, output component 360, communication interface 370, and/or the like) may receive authorization to use a portion of the credit balance from the benefit account of the donor user to reduce the debit balance of the account of the recipient user, as described above.

As further shown in FIG. 4, process 400 may include performing an action to facilitate use of the portion of the credit balance from the benefit account of the donor user to reduce the debit balance of the account of the recipient user (block 460). For example, the first device (e.g., using computing resource 235, processor 320, memory 330, storage component 340, input component 350, output component 360, communication interface 370, and/or the like) may perform an action to facilitate use of the portion of the credit balance from the benefit account of the donor user to reduce the debit balance of the account of the recipient user, as described above.

As further shown in FIG. 4, process 400 may include performing an action to reduce the credit balance of the benefit account of the donor user (block 470). For example, the first device (e.g., using computing resource 235, processor 320, memory 330, storage component 340, input component 350, output component 360, communication interface 370, and/or the like) may perform an action to reduce the credit balance of the benefit account of the donor user, as described above.

As further shown in FIG. 4, process 400 may include providing a notification that the debit balance of the account of the recipient user has been reduced using the portion of the credit balance from the benefit account of the donor user (block 480). For example, the first device (e.g., using computing resource 235, processor 320, memory 330, storage component 340, input component 350, output component 360, communication interface 370, and/or the like) may provide a notification that the debit balance of the account of the recipient user has been reduced using the portion of the credit balance from the benefit account of the donor user, as described above.

Process 400 may include additional implementations, such as any single implementation or any combination of implementations described below and/or in connection with one or more other processes described elsewhere herein.

In a first implementation, process 400 may include receiving one or more financial-institution selections including a type of account having a debit balance for which the portion of the credit balance may be used a characteristic of a recipient user for which the portion of the credit balance may be used, and/or a characteristic of a recipient user for which the portion of the credit balance may not be used.

In a second implementation, alone or in combination with the first implementation, process 400 may include processing information associated with the second set of users with accounts having debit balances using a third machine learning model to determine a third subset of users with accounts having debit balances that have characteristics similar to characteristics of the recipient user for which authorization was received and providing information requesting authorization to use a portion of the credit balance from the benefit account of the donor user to reduce the debit balances of the accounts of the third subset of users.

In a third implementation, alone or in combination with one or more of the first and second implementations, process 400 may include receiving a message from the recipient user and providing the message from the recipient user for display to the donor user.

In a fourth implementation, alone or in combination with one or more of the first through third implementations, process 400 may include receiving information indicating that the recipient user made a payment to the account having the debit balance and performing an action to facilitate use of the portion of the credit balance to reduce the debit balance based on the received information.

In a fifth implementation, alone or in combination with one or more of the first through fourth implementations, process 400 may include providing, for display to the donor user, information regarding a plurality of portions of the credit balance from the benefit account that have been used to reduce debit balances.

In a sixth implementation, alone or in combination with one or more of the first through fifth implementations, process 400 may include providing, for display to the recipient user, information regarding a plurality of portions of credit balances from benefit accounts that have been used to reduce the debit balance of the account of the recipient user.

In a seventh implementation, alone or in combination with one or more of the first through sixth implementations, process 400 may include processing information associated with the recipient user to determine a trigger event resulting in the recipient user permitting the account to have a debit balance, processing information associated with the second set of users to determine a third subset of recipient users associated with the trigger event resulting in the third subset of recipient users permitting accounts to have debit balances, and providing information requesting authorization to use a portion of the credit balance from the benefit account of the donor user to reduce the debit balances of the accounts of the third subset of recipient users associated with the trigger event.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
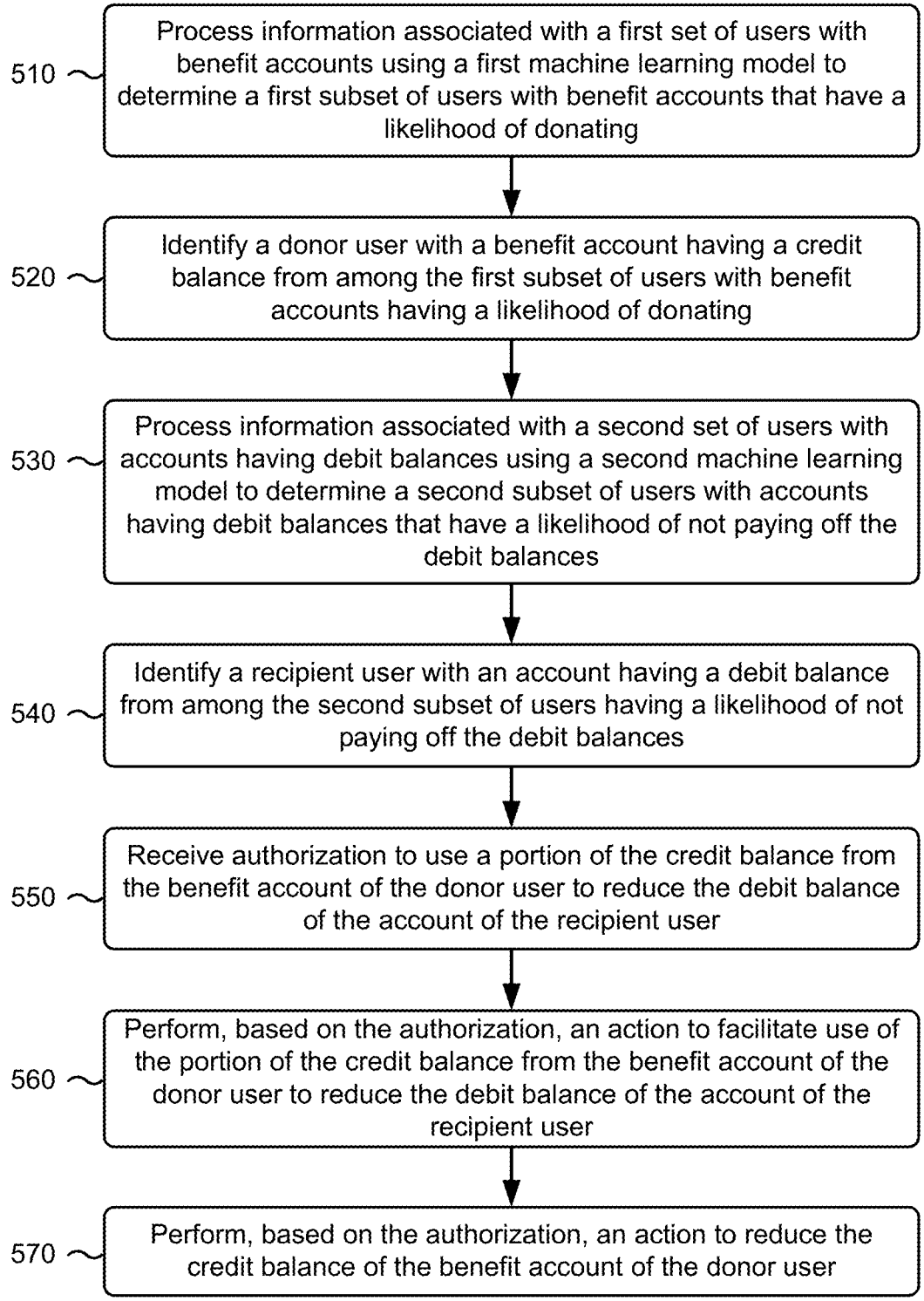

FIG. 5 is a flow chart of an example process 500 for donating benefit account rewards. In some implementations, one or more process blocks of FIG. 5 may be performed by a first device (e.g., reward donation platform 230). In some implementations, one or more process blocks of FIG. 4 may be performed by another device or a group of devices separate from or including the first device, such as a recipient user device (e.g., recipient user device 210), a donor user device (e.g., donor user device 220), and/or the like.

As shown in FIG. 5, process 500 may include processing information associated with a first set of users with benefit accounts using a first machine learning model to determine a first subset of users with benefit accounts that have a likelihood of donating (block 510). For example, the first device (e.g., using computing resource 235, processor 320, memory 330, storage component 340, input component 350, output component 360, communication interface 370, and/or the like) may process information associated with a first set of users with benefit accounts using a first machine learning model to determine a first subset of users with benefit accounts that have a likelihood of donating, as described above.

As further shown in FIG. 5, process 500 may include identifying a donor user with a benefit account having a credit balance from among the first subset of users with benefit accounts having a likelihood of donating (block 520). For example, the first device (e.g., using computing resource 235, processor 320, memory 330, storage component 340, input component 350, output component 360, communication interface 370, and/or the like) may identify a donor user with a benefit account having a credit balance from among the first subset of users with benefit accounts having a likelihood of donating, as described above.

As further shown in FIG. 5, process 500 may include processing information associated with a second set of users with accounts having debit balances using a second machine learning model to determine a second subset of users with accounts having debit balances that have a likelihood of not paying off the debit balances (block 530). For example, the first device (e.g., using computing resource 235, processor 320, memory 330, storage component 340, input component 350, output component 360, communication interface 370, and/or the like) may process information associated with a second set of users with accounts having debit balances using a second machine learning model to determine a second subset of users with accounts having debit balances that have a likelihood of not paying off the debit balances, as described above.

As further shown in FIG. 5, process 500 may include identifying a recipient user with an account having a debit balance from among the second subset of users having a likelihood of not paying off the debit balances (block 540). For example, the first device (e.g., using computing resource 235, processor 320, memory 330, storage component 340, input component 350, output component 360, communication interface 370, and/or the like) may identify a recipient user with an account having a debit balance from among the second subset of users having a likelihood of not paying off the debit balances, as described above.

As further shown in FIG. 5, process 500 may include receiving authorization to use a portion of the credit balance from the benefit account of the donor user to reduce the debit balance of the account of the recipient user (block 550). For example, the first device (e.g., using computing resource 235, processor 320, memory 330, storage component 340, input component 350, output component 360, communication interface 370, and/or the like) may receive authorization to use a portion of the credit balance from the benefit account of the donor user to reduce the debit balance of the account of the recipient user, as described above.

As further shown in FIG. 5, process 500 may include performing, based on the authorization, an action to facilitate use of the portion of the credit balance from the benefit account of the donor user to reduce the debit balance of the account of the recipient user (block 560). For example, the first device (e.g., using computing resource 235, processor 320, memory 330, storage component 340, input component 350, output component 360, communication interface 370, and/or the like) may perform, based on the authorization, an action to facilitate use of the portion of the credit balance from the benefit account of the donor user to reduce the debit balance of the account of the recipient user, as described above.

As further shown in FIG. 5, process 500 may include performing, based on the authorization, an action to reduce the credit balance of the benefit account of the donor user (block 570). For example, the first device (e.g., using computing resource 235, processor 320, memory 330, storage component 340, input component 350, output component 360, communication interface 370, and/or the like) may perform, based on the authorization, an action to reduce the credit balance of the benefit account of the donor user, as described above.

Process 500 may include additional implementations, such as any single implementation or any combination of implementations described below and/or in connection with one or more other processes described elsewhere herein.

In a first implementation, process 500 may include processing information associated with a third set of users with accounts having debit balances using a third machine learning model to determine that a third subset of users with accounts having debit balances have characteristics similar to characteristics of the recipient user for which authorization was received and providing information requesting authorization to use a portion of the credit balance from the benefit account of the donor user to reduce the debit balances of the accounts of the third subset of users.

In a second implementation, alone or in combination with the first implementation, process 500 may include receiving one or more financial-institution selections including a type of account having a debit balance for which the portion of the credit balance may be used, a characteristic of a recipient user for which the portion of the credit balance may be used, and/or a characteristic of a recipient user for which the portion of the credit balance may not be used, and, when identifying the recipient user from among the second subset of users, identifying, from among the second subset of users, a recipient user satisfying the one or more financial-institution selections.

In a third implementation, alone or in combination with one or more of the first and second implementations, process 500 may include receiving information indicating that the recipient user made a payment to the account having the debit balance and performing an action to facilitate use of the portion of the credit balance to reduce the debit balance based on the received information.

In a fourth implementation, alone or in combination with one or more of the first through third implementations, process 500 may include providing, for display to the donor user, information regarding a plurality of portions of the credit balance from the benefit account that have been used to reduce debit balances.

In a fifth implementation, alone or in combination with one or more of the first through fourth implementations, process 500 may include processing information associated with the recipient user to determine a trigger event resulting in the recipient user permitting the account to have a debit balance, processing information associated with the second set of users to determine a third subset of recipient users associated with the trigger event resulting in the third subset of recipient users permitting accounts to have debit balances, and providing information requesting authorization to use a portion of the credit balance from the benefit account of the donor user to reduce the debit balances of accounts of the third subset of recipient users associated with the trigger event.

In a sixth implementation, alone or in combination with one or more of the first through fifth implementations, process 500 may include, when performing the action to facilitate use of the portion of the credit balance from the benefit account of the donor user to reduce the debit balance of the account of the recipient user, using the portion of the credit balance to eliminate a portion of or a total of the debit balance of the account, using the portion of the credit balance to reduce the debit balance of the account by an amount corresponding to a portion of or a total of late payments, using the portion of the credit balance to reduce the debit balance of the account by an amount corresponding to a portion of or a total of a payment due but unpaid, or using the portion of the credit balance to reduce the debit balance of the account by an amount corresponding to a fraction or a multiple of a value of the portion of the credit balance.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
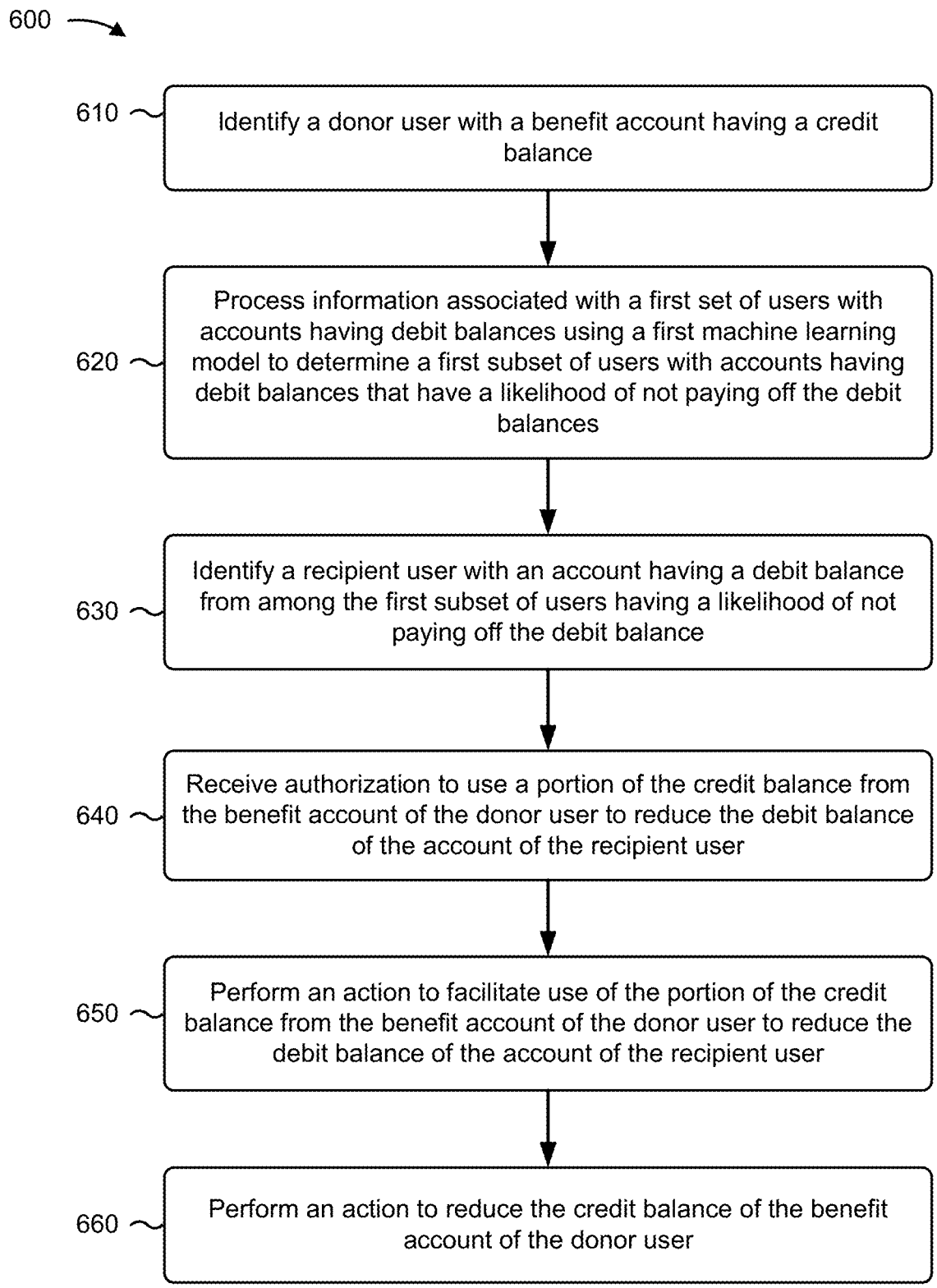

FIG. 6 is a flow chart of an example process 600 for donating benefit account rewards. In some implementations, one or more process blocks of FIG. 6 may be performed by a reward donation platform (e.g., reward donation platform 230). In some implementations, one or more process blocks of FIG. 4 may be performed by another device or a group of devices separate from or including the reward donation platform, such as a recipient user device (e.g., recipient user device 210), a donor user device (e.g., donor user device 220), and/or the like.

As shown in FIG. 6, process 600 may include identifying a donor user with a benefit account having a credit balance (block 610). For example, the reward donation platform (e.g., using computing resource 235, processor 320, memory 330, storage component 340, input component 350, output component 360, communication interface 370, and/or the like) may identify a donor user with a benefit account having a credit balance, as described above.

As further shown in FIG. 6, process 600 may include processing information associated with a first set of users with accounts having debit balances using a first machine learning model to determine a first subset of users with accounts having debit balances that have a likelihood of not paying off the debit balances (block 620). For example, the reward donation platform (e.g., using computing resource 235, processor 320, memory 330, storage component 340, input component 350, output component 360, communication interface 370, and/or the like) may process information associated with a first set of users with accounts having debit balances using a first machine learning model to determine a first subset of users with accounts having debit balances that have a likelihood of not paying off the debit balances, as described above.

As further shown in FIG. 6, process 600 may include identifying a recipient user with an account having a debit balance from among the first subset of users having a likelihood of not paying off the debit balance (block 630). For example, the reward donation platform (e.g., using computing resource 235, processor 320, memory 330, storage component 340, input component 350, output component 360, communication interface 370, and/or the like) may identify a recipient user with an account having a debit balance from among the first subset of users having a likelihood of not paying off the debit balance, as described above.

As further shown in FIG. 6, process 600 may include receiving authorization to use a portion of the credit balance from the benefit account of the donor user to reduce the debit balance of the account of the recipient user (block 640). For example, the reward donation platform (e.g., using computing resource 235, processor 320, memory 330, storage component 340, input component 350, output component 360, communication interface 370, and/or the like) may receive authorization to use a portion of the credit balance from the benefit account of the donor user to reduce the debit balance of the account of the recipient user, as described above.

As further shown in FIG. 6, process 600 may include performing an action to facilitate use of the portion of the credit balance from the benefit account of the donor user to reduce the debit balance of the account of the recipient user (block 650). For example, the reward donation platform (e.g., using computing resource 235, processor 320, memory 330, storage component 340, input component 350, output component 360, communication interface 370, and/or the like) may perform an action to facilitate use of the portion of the credit balance from the benefit account of the donor user to reduce the debit balance of the account of the recipient user, as described above.

As further shown in FIG. 6, process 600 may include performing an action to reduce the credit balance of the benefit account of the donor user (block 660). For example, the reward donation platform (e.g., using computing resource 235, processor 320, memory 330, storage component 340, input component 350, output component 360, communication interface 370, and/or the like) may perform an action to reduce the credit balance of the benefit account of the donor user, as described above.

Process 600 may include additional implementations, such as any single implementation or any combination of implementations described below and/or in connection with one or more other processes described elsewhere herein.

In a first implementation, process 600 may include receiving one or more financial-institution selections including a type of account having a debit balance for which the portion of the credit balance may be used, a characteristic of a recipient user for which the portion of the credit balance may be used, and/or a characteristic of a recipient user for which the portion of the credit balance may not be used, and when identifying the recipient user from among the first subset of users, identifying a recipient user satisfying the one or more financial-institution selections.

In a second implementation, alone or in combination with the first implementation, process 600 may include processing information associated with a second set of users with accounts having debit balances using a second machine learning model to determine a second subset of users with accounts having debit balances that have characteristics similar to characteristics of the recipient user for which authorization was received and providing information requesting authorization to use a portion of the credit balance from the benefit account of the donor user to reduce the debit balances of the accounts of the second subset of users.

In a third implementation, alone or in combination with one or more of the first and second implementations, process 600 may include receiving a message from the recipient user and providing the message from the recipient user for display to the donor user.

In a fourth implementation, alone or in combination with one or more of the first through third implementations, process 600 may include processing information associated with the recipient user to determine a trigger event resulting in the recipient user permitting the account to have a debit balance, processing information associated with the first set of users to determine a second subset of recipient users associated with the trigger event resulting in the second subset of recipient users permitting accounts to have debit balances, and providing information requesting authorization to use a portion of the credit balance from the benefit account of the donor user to reduce the debit balances of accounts of the second subset of recipient users associated with the trigger event.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
processing, by a first device, information associated with a first set of users with benefit accounts using a first machine learning model to determine a first subset of users with benefit accounts that have a likelihood of donating;
identifying, by the first device, a donor user with a benefit account having a credit balance from among the first subset of users with benefit accounts having a likelihood of donating;
performing, by the first device, dimensionality reduction to reduce the information associated with a second set of users with accounts having debit balances to a minimum feature set;
performing, by the first device, binary recursive partitioning to split data of the minimum feature set into one or more partitions;
processing, by the first device, a partition, of the one or more partitions, using a second machine learning model to determine a second subset of users with accounts having debit balances that have a likelihood of not paying off the debit balances;
identifying, by the first device, a recipient user with an account having a debit balance from among the second subset of users having a likelihood of not paying off the debit balances;
receiving, by the first device and from a second device, authorization to use a portion of the credit balance from the benefit account of the donor user to reduce the debit balance of the account of the recipient user;
performing, by the first device, an action to facilitate use of the portion of the credit balance from the benefit account of the donor user to reduce the debit balance of the account of the recipient user;
performing, by the first device, an action to reduce the credit balance of the benefit account of the donor user; and
providing, by the first device and to a third device, a notification that the debit balance of the account of the recipient user has been reduced using the portion of the credit balance from the benefit account of the donor user.

2. The method of claim 1, further comprising:
receiving one or more financial-institution selections including:
a type of account having a debit balance for which the portion of the credit balance may be used;
a characteristic of a recipient user for which the portion of the credit balance may be used; and/or
a characteristic of a recipient user for which the portion of the credit balance may not be used; and
wherein identifying the recipient user from among the second subset of users comprises identifying, from among the second subset of users, a recipient user satisfying the one or more financial-institution selections.

3. The method of claim 1, further comprising:
processing information associated with the second set of users with accounts having debit balances using a third machine learning model to determine a third subset of users with accounts having debit balances that have characteristics similar to characteristics of the recipient user for which authorization was received; and
providing, to the second device, information requesting authorization to use a portion of the credit balance from the benefit account of the donor user to reduce the debit balances of the accounts of the third subset of users.

4. The method of claim 1, further comprising:
receiving, from the third device, a message from the recipient user; and
providing, to the second device, the message from the recipient user for display to the donor user.

5. The method of claim 1, further comprising:
receiving information indicating that the recipient user made a payment to the account having the debit balance; and
performing an action to facilitate use of the portion of the credit balance to reduce the debit balance based on the received information.

6. The method of claim 1, further comprising:
providing, to the second device for display to the donor user, information regarding a plurality of portions of the credit balance from the benefit account that have been used to reduce debit balances.

7. The method of claim 1, further comprising:
providing, to the third device for display to the recipient user, information regarding a plurality of portions of credit balances from benefit accounts that have been used to reduce the debit balance of the account of the recipient user.

8. The method of claim 1, further comprising:
processing information associated with the recipient user to determine a trigger event resulting in the recipient user permitting the account to have a debit balance;
processing information associated with the second set of users to determine a third subset of recipient users associated with the trigger event resulting in the third subset of recipient users permitting accounts to have debit balances; and
providing, to the second device, information requesting authorization to use a portion of the credit balance from the benefit account of the donor user to reduce the debit balances of the accounts of the third subset of recipient users associated with the trigger event.

9. A first device, comprising:
one or more memories; and
one or more processors, communicatively coupled to the one or more memories, configured to:
process information associated with a first set of users with benefit accounts using a first machine learning model to determine a first subset of users with benefit accounts that have a likelihood of donating;
identify a donor user with a benefit account having a credit balance from among the first subset of users with benefit accounts having a likelihood of donating;
train a second machine learning model to identify patterns in historical user account characteristics associated with a historical likelihood of not paying off a debit balance,
wherein the one or more processors, to train the second machine learning model, are configured to:
portion the historical user account characteristics associated with a historical likelihood of not paying off a debit balance into a training set, a validation set, and a test set, and
perform a support vector machine classifier technique to generate a non-linear boundary between data items in the training set;
process information associated with a second set of users with accounts having debit balances using the second machine learning model to determine a second subset of users with accounts having debit balances that have a likelihood of not paying off the debit balances;
identify a recipient user with an account having a debit balance from among the second subset of users having a likelihood of not paying off the debit balances;
receive, from a second device, authorization to use a portion of the credit balance from the benefit account of the donor user to reduce the debit balance of the account of the recipient user;
perform, based on the authorization, an action to facilitate use of the portion of the credit balance from the benefit account of the donor user to reduce the debit balance of the account of the recipient user; and
perform, based on the authorization, an action to reduce the credit balance of the benefit account of the donor user.

10. The first device of claim 9, wherein the one or more processors are further configured to:
process information associated with a third set of users with accounts having debit balances using a third machine learning model to determine that a third subset of users with accounts having debit balances have characteristics similar to characteristics of the recipient user for which authorization was received; and
provide, to the second device, information requesting authorization to use a portion of the credit balance from the benefit account of the donor user to reduce the debit balances of the accounts of the third subset of users.

11. The first device of claim 9, wherein the one or more processors are further configured to:
receive one or more financial-institution selections including:
a type of account having a debit balance for which the portion of the credit balance may be used,
a characteristic of a recipient user for which the portion of the credit balance may be used, and/or
a characteristic of a recipient user for which the portion of the credit balance may not be used; and
when identifying the recipient user from among the second subset of users, the one or more processors are configured to identify, from among the second subset of users, a recipient user satisfying the one or more financial-institution selections.

12. The first device of claim 9, wherein the one or more processors are further configured to:
receive information indicating that the recipient user made a payment to the account having the debit balance; and
perform an action to facilitate use of the portion of the credit balance to reduce the debit balance based on the received information.

13. The first device of claim 9, wherein the one or more processors are further configured to:
provide, to the second device for display to the donor user, information regarding a plurality of portions of the credit balance from the benefit account that have been used to reduce debit balances.

14. The first device of claim 9, wherein the one or more processors are further configured to:
process information associated with the recipient user to determine a trigger event resulting in the recipient user permitting the account to have a debit balance;
process information associated with the second set of users to determine a third subset of recipient users associated with the trigger event resulting in the third subset of recipient users permitting accounts to have debit balances; and
provide, to the second device, information requesting authorization to use a portion of the credit balance from the benefit account of the donor user to reduce the debit balances of accounts of the third subset of recipient users associated with the trigger event.

15. The first device of claim 9, wherein the one or more processors, when performing the action to facilitate use of the portion of the credit balance from the benefit account of the donor user to reduce the debit balance of the account of the recipient user, are configured to:
use the portion of the credit balance to eliminate a portion of or a total of the debit balance of the account;
use the portion of the credit balance to reduce the debit balance of the account by an amount corresponding to a portion of or a total of late payments;

use the portion of the credit balance to reduce the debit balance of the account by an amount corresponding to a portion of or a total of a payment due but unpaid; or
use the portion of the credit balance to reduce the debit balance of the account by an amount corresponding to a fraction or a multiple of a value of the portion of the credit balance.

16. A non-transitory computer-readable medium storing instructions, the instructions comprising:
one or more instructions that, when executed by one or more processors, cause the one or more processors to:
identify a donor user with a benefit account having a credit balance;
train a first machine learning model to identify patterns in historical user account characteristics associated with historical likelihoods of not paying off a debit balance,
wherein training the first machine learning model comprises:
determining a Hamming Loss Metric relating to an accuracy associated with a historical user account characteristic, of the historical user account characteristics, and
finalizing the first machine learning model based on the Hamming Loss metric;
process information associated with a first set of users with accounts having debit balances using the first machine learning model to determine a first subset of users with accounts having debit balances that have a likelihood of not paying off the debit balances;
identify a recipient user with an account having a debit balance from among the first subset of users having a likelihood of not paying off the debit balance;
receive authorization to use a portion of the credit balance from the benefit account of the donor user to reduce the debit balance of the account of the recipient user;
perform an action to facilitate use of the portion of the credit balance from the benefit account of the donor user to reduce the debit balance of the account of the recipient user; and
perform an action to reduce the credit balance of the benefit account of the donor user.

17. The non-transitory computer-readable medium of claim 16, wherein the one or more instructions, when executed by the one or more processors, further cause the one or more processors to:
receive one or more financial-institution selections including:
a type of account having a debit balance for which the portion of the credit balance may be used;
a characteristic of a recipient user for which the portion of the credit balance may be used; and/or
a characteristic of a recipient user for which the portion of the credit balance may not be used; and
when identifying the recipient user from among the first subset of users, identify a recipient user satisfying the one or more financial-institution selections.

18. The non-transitory computer-readable medium of claim 16, wherein the one or more instructions, when executed by the one or more processors, further cause the one or more processors to:
process information associated with a second set of users with accounts having debit balances using a second machine learning model to determine a second subset of users with accounts having debit balances that have characteristics similar to characteristics of the recipient user for which authorization was received; and
provide information requesting authorization to use a portion of the credit balance from the benefit account of the donor user to reduce the debit balances of the accounts of the second subset of users.

19. The non-transitory computer-readable medium of claim 16, wherein the one or more instructions, when executed by the one or more processors, further cause the one or more processors to:
receive a message from the recipient user; and
provide the message from the recipient user for display to the donor user.

20. The non-transitory computer-readable medium of claim 16, wherein the one or more instructions, when executed by the one or more processors, further cause the one or more processors to:
process information associated with the recipient user to determine a trigger event resulting in the recipient user permitting the account to have a debit balance;
process information associated with the first set of users to determine a second subset of recipient users associated with the trigger event resulting in the second subset of recipient users permitting accounts to have debit balances; and
provide information requesting authorization to use a portion of the credit balance from the benefit account of the donor user to reduce the debit balances of accounts of the second subset of recipient users associated with the trigger event.

* * * * *